US012518681B2

(12) United States Patent
Xiang et al.

(10) Patent No.: US 12,518,681 B2
(45) Date of Patent: Jan. 6, 2026

(54) DISPLAY APPARATUS AND DRIVING METHOD WITH IMPROVED ACCURACY OF LIGHT INTENSITY SIGNAL

(71) Applicants: Chengdu BOE Optoelectronics Technology Co., Ltd., Sichuan (CN); BOE TECHNOLOGY GROUP CO., LTD., Beijing (CN)

(72) Inventors: Lian Xiang, Beijing (CN); Gong Chen, Beijing (CN); Yakun Kong, Beijing (CN); Zheng Bao, Beijing (CN); Bin Zhang, Beijing (CN); Jiaxiang Zhang, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/688,776

(22) PCT Filed: Jan. 12, 2023

(86) PCT No.: PCT/CN2023/071924

§ 371 (c)(1), (2) Date: Mar. 3, 2024

(87) PCT Pub. No.: WO2024/148569

PCT Pub. Date: Jul. 18, 2024

(65) Prior Publication Data

US 2025/0124852 A1 Apr. 17, 2025

(51) Int. Cl.

| | |
|---|---|
| ***G09G 3/3225*** | (2016.01) |
| ***G09G 3/32*** | (2016.01) |
| *G09G 3/3233* | (2016.01) |

(52) U.S. Cl.

CPC ............. *G09G 3/32* (2013.01); *G09G 3/3225* (2013.01); *G09G 3/3233* (2013.01); (Continued)

(58) Field of Classification Search

CPC .... G09G 3/32; G09G 3/3225; G09G 2310/08; G09G 2330/021; G09G 2360/144; G09G 3/3233

See application file for complete search history.

(56) References Cited

U.S. PATENT DOCUMENTS

| | | | | |
|---|---|---|---|---|
| 2020/0074928 A1 | | 3/2020 | Li et al. | |
| 2020/0211474 A1* | | 7/2020 | Kim | G09G 3/3266 |

(Continued)

FOREIGN PATENT DOCUMENTS

| | | |
|---|---|---|
| CN | 108877680 A | 11/2018 |
| CN | 108924316 A | 11/2018 |

(Continued)

*Primary Examiner* — Adam J Snyder

(74) *Attorney, Agent, or Firm* — HOUTTEMAN LAW LLC

(57) ABSTRACT

The present disclosure provides a driving method and a display apparatus, including: a display panel; a driving circuit electrically connected to the display panel, and the driving circuit is configured to control, in response to the fact that each of sub-pixels in a photosensitive area of the display panel is controlled to be in a non-light-emitting state in a light-emitting period during a preset display frame, each of photosensitive elements in the photosensitive area to collect a light intensity signal of incident light.

17 Claims, 12 Drawing Sheets

(52) U.S. Cl.
CPC ... *G09G 2310/08* (2013.01); *G09G 2330/021* (2013.01); *G09G 2360/144* (2013.01)

(56) References Cited

U.S. PATENT DOCUMENTS

| | | | | |
|---|---|---|---|---|
| 2021/0201762 | A1* | 7/2021 | He | G09G 3/3266 |
| 2021/0304663 | A1* | 9/2021 | Kim | G09G 3/32 |

FOREIGN PATENT DOCUMENTS

| | | | |
|---|---|---|---|
| CN | 112509515 | A | 3/2021 |
| CN | 112562591 | A | 3/2021 |
| CN | 114648939 | A | 6/2022 |
| KR | 20200030431 | A | 3/2020 |
| WO | WO2021147086 | A1 | 7/2021 |

* cited by examiner

DISPLAY APPARATUS AND DRIVING METHOD WITH IMPROVED ACCURACY OF LIGHT INTENSITY SIGNAL

TECHNICAL FIELD

The present disclosure relates to the field of display technology, and in particular to a display apparatus and a driving method.

BACKGROUND

A display, such as an Organic Light-Emitting Diode (OLED) display, generally includes a plurality of pixel units. Each pixel unit may include: a plurality of sub-pixels of different colors. By controlling brightness of light emitted by the sub-pixels with different colors, these colors can be mixed to obtain a color desired to be displayed, so that a color image can be displayed.

SUMMARY

A display apparatus according to an embodiment of the present disclosure includes: a display panel; and a driving circuit electrically connected to the display panel, and the driving circuit is configured to control, in response to the fact that each of sub-pixels in a photosensitive area of the display panel is controlled to be in a non-light-emitting state in a light-emitting period during a preset display frame, each of photosensitive elements in the photosensitive area to collect a light intensity signal of incident light.

In some possible implementations, the display panel includes a first area and a second area sequentially arranged in a column direction of the sub-pixels, the first area including the photosensitive area; and the driving circuit is further configured to control, in response to the fact that each of the sub-pixels in the first area is controlled to be in the non-light-emitting state in the light-emitting period during the preset display frame, each of the photosensitive elements in the photosensitive area to collect the light intensity signal of incident light.

In some possible implementations, the driving circuit is further configured to control an inactive pulse with a first duration to occur, in the light-emitting period, in a light emission control signal corresponding to each sub-pixel in the first area, to make each sub-pixel in the first area be in the non-light-emitting state in the light-emitting period, and a level of the inactive pulse of the light emission control signal is configured to control a light emission control transistor in the display panel to be turned off, and the first duration is longer than a duration of the non-light-emitting period of each sub-pixel, the non-light-emitting period occurring before the light-emitting period.

In some possible implementations, the light emission control signal has at least one inactive pulse in the light-emitting period; and one of the at least one inactive pulse is the inactive pulse with the first duration.

In some possible implementations, in a case where the light emission control signal has a plurality of inactive pulses in the light-emitting period, one of the inactive pulses having a longest duration is the inactive pulse with the first duration.

In some possible implementations, the driving circuit is further configured to stop outputting the light emission control signal to each of sub-pixels in the second area during the preset display frame.

In some possible implementations, the driving circuit is further configured to control an inactive pulse with a second duration to occur, during the preset display frame, in the light emission control signal corresponding to each sub-pixel in the second area in the light-emitting period, to make each sub-pixel in the second area be in the non-light-emitting state in the light-emitting period; and the inactive pulse with the first duration and the inactive pulse with the second duration are inactive pulses having the same occurrence order in the respective light emission control signals, and the first duration is longer than the second duration.

In some possible implementations, the driving circuit is further configured to control, during each of remaining display frames other than the preset display frame, light emission control signals corresponding to the sub-pixels in the first area and the second area to be the same.

In some possible implementations, the display panel further includes: a first light emission control circuit and a second light emission control circuit, the first light emission control circuit being electrically connected to the sub-pixels in the first area, and the second light emission control circuit being electrically connected to the sub-pixels in the second area; and the driving circuit is further configured to control the first light emission control circuit to output a corresponding light emission control signal to each sub-pixel in the first area, and control the second light emission control circuit to output a corresponding light emission control signal to each sub-pixel in the second area.

In some possible implementations, each of a plurality of adjacent display frames is the preset display frame; and/or at least two display frames of a plurality of adjacent display frames each are the preset display frame, and at least one of remaining display frames other than the preset display frame is arranged between every two adjacent preset display frames.

In some possible implementations, at least two display frames of a plurality of adjacent display frames each are the preset display frame; and the driving circuit is further configured to control each sub-pixel in the photosensitive area to be input with a data voltage corresponding to a zero grayscale during the preset display frame.

In some possible implementations, at least two display frames of a plurality of adjacent display frames each are the preset display frame; and the driving circuit is further configured to control each sub-pixel in a rest area of the display panel to be in a state of holding data voltage during each preset display frame.

In some possible implementations, the driving circuit is further configured to control each of the sub-pixels in the display panel to be input with a data voltage corresponding to a corresponding grayscale during each of the remaining display frames other than each preset display frame.

In some possible implementations, the driving circuit is further configured to control, during each of the plurality of display frames, each sub-pixel in the display panel to be input with a data voltage corresponding to a corresponding grayscale.

An embodiment of the present disclosure further provides a driving method, including: controlling, in response to the fact that each sub-pixel in a photosensitive area of a display panel is controlled to be in a non-light-emitting state in a light-emitting period during a preset display frame, each photosensitive element in the photosensitive area to collect a light intensity signal of incident light.

In some possible implementations, the display panel includes a first area and a second area sequentially disposed in a column direction of the sub-pixels, the first area including the photosensitive area; the controlling each of sub-pixels in a photosensitive area of a display panel to be in a non-light-emitting state in a light-emitting period during a preset display frame includes: controlling an inactive pulse with a first duration to occur, in the light-emitting period, in a light emission control signal corresponding to each sub-pixel in the first area, to make each sub-pixel in the first area be in the non-light-emitting state in the light-emitting period, and a level of the inactive pulse of the light emission control signal is configured to control a light emission control transistor in the display panel to be turned off, and the first duration is longer than a duration of the non-light-emitting period of each sub-pixel, the non-light-emitting period occurring before the light-emitting period.

In some possible implementations, the light emission control signal has at least one inactive pulse in the light-emitting period; and one of the at least one inactive pulse is the inactive pulse with the first duration.

In some possible implementations, the light emission control signal has a plurality of inactive pulses in the light-emitting period, and one of the inactive pulses having a longest duration is the inactive pulse with the first duration.

In some possible implementations, the driving method further includes: controlling an inactive pulse with a second duration to occur, during the preset display frame, in the light emission control signal corresponding to each sub-pixel in the second area the light-emitting period, to make each sub-pixel in the second area be in the non-light-emitting state in the light-emitting period; and the inactive pulse with the first duration and the inactive pulse with the second duration are inactive pulses having the same occurrence order in the respective light emission control signals, and the first duration is longer than the second duration.

In some possible implementations, the driving method further includes: controlling, during each of remaining display frame other than the preset display frame, light emission control signals corresponding to the sub-pixels in the first area and the second area to be the same.

In some possible implementations, each of a plurality of adjacent display frames is the preset display frame; and/or at least two display frames of a plurality of adjacent display frames are the preset display frame, and at least one rest display frame other than the preset display frame is arranged between every two adjacent preset display frames.

In some possible implementations, the driving method further includes: further including: controlling, in response to that at least two display frames of the adjacent display frames are the preset display frames, each sub-pixel in the photosensitive area to be input with a data voltage corresponding to zero grayscale during each preset display frame.

In some possible implementations, the driving method further includes: controlling, in response to that at least two display frames of the adjacent display frames are the preset display frames, each sub-pixel in a rest area of the display panel to be in a state of holding data voltage during each preset display frame.

In some possible implementations, the driving method further includes: control each of the sub-pixels in the display panel to be input with a data voltage corresponding to a corresponding grayscale during each of the remaining display frames other than each preset display frame.

In some possible implementations, the driving method further includes: controlling, during each of the plurality of display frames, each sub-pixel in the display panel to be input with a data voltage corresponding to a corresponding grayscale.

DETAIL DESCRIPTION OF EMBODIMENTS

Figure 1:
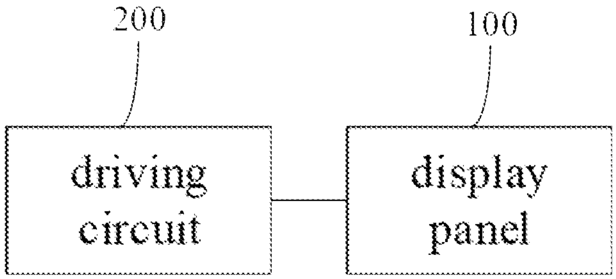
FIG. 1 is a schematic diagram of a structure of a display apparatus according to an embodiment of the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and not all embodiments. The embodiments and features of the embodiments in the present disclosure may be combined with each other without conflict. All other embodiments, which can be derived by a person skilled in the art from the described embodiments of the present disclosure without creative effort, are within the protection scope of the present disclosure.

Unless defined otherwise, technical or scientific terms used herein shall have the ordinary meaning as understood by a person skilled in the art to which the present disclosure belongs. The term “first”, “second” and the like in the present disclosure is not intended to indicate any order, quantity, or importance, but rather is used to distinguish one element from another. The term “comprising/including”, “comprises/includes”, or the like means that the element or item preceding the word comprises/includes the element or item listed after the word and its equivalent, but does not exclude other elements or items. The term "connected/coupled", "connecting/coupling" or the like is not restricted to physical or mechanical connections, but may include electrical connections, whether direct or indirect.

It should be noted that sizes and shapes of various figures in the drawings are not to scale, but are merely intended to illustrate the present disclosure. Like reference numerals refer to like or similar elements or elements having like or similar functions throughout.

In an embodiment, as shown in FIG. 1, a display apparatus may include a display panel 100 and a driving circuit 200. The driving circuit 200 is electrically connected to the display panel 100, and the driving circuit 200 may drive the display panel to operate. In some implementations, the driving circuit 200 may be implemented by combining a software and a hardware. For example, the driving circuit 200 may be an Integrated Circuit (IC).

Figure 2A:
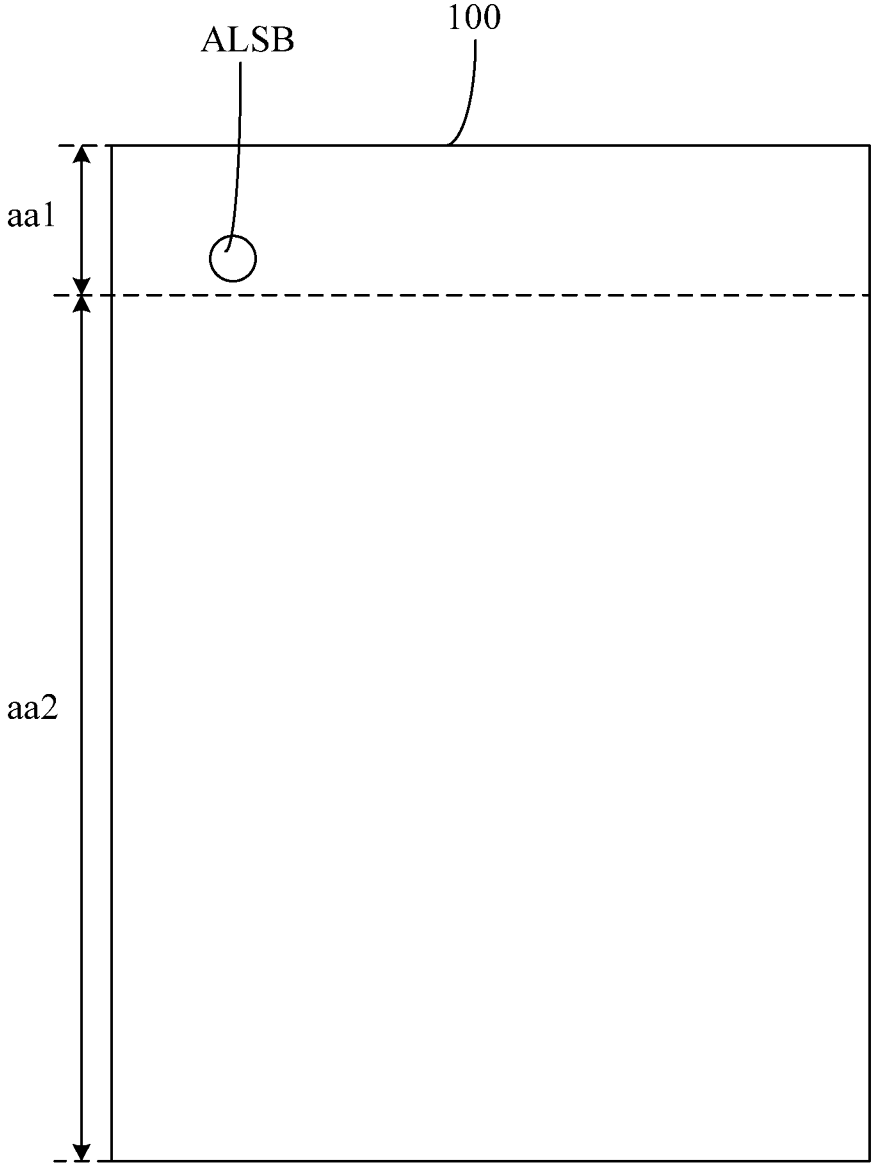
FIG. 2*a* is a schematic diagram of a structure of a display panel according to an embodiment of the present disclosure.
Figure 2B:
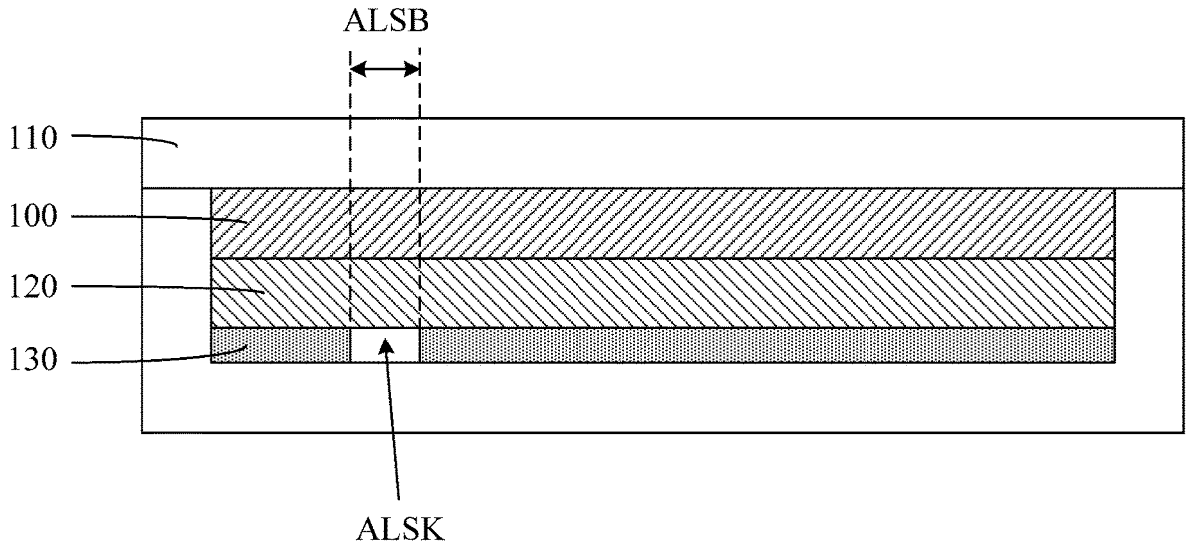
FIG. 2*b* is a schematic cross-sectional diagram of a structure of a display panel according to an embodiment of the present disclosure.

In some implementations, as shown in FIGS. 2*a* and 2*b*, the display apparatus generally includes a plurality of different structures in layers including, for example, a cover top layer 110 composed of a glass cover plate, a display layer composed of the display panel 100, a transparent protection layer 120 composed of a protection film, and a blocking layer 130 composed of black gel, foam, and the like. In the embodiment of the present disclosure, the blocking layer 130 may be provided therein with an opening ALSK, and a photosensitive element array formed by a plurality of photosensitive elements is disposed in the opening ALSK. Furthermore, an area of the display panel 100 corresponding to the opening ALSK may be a photosensitive area ALSB.

In some implementations, in a case where brightness of the display panel is adjusted based on the photosensitive element array, the photosensitive element array may be an array of ambient light sensors (ALS).

In some implementations, in a case where photographing and video recording functions are implemented based on the photosensitive element array, the photosensitive element array may be a photodetector array in a camera.

In some implementations, in a case where a fingerprint recognition function is implemented based on the photosensitive element array, the photosensitive element array may be a fingerprint recognition detector array.

In some implementations, the display panel 100 may include a display area including a plurality of pixel units arranged in an array, and a non-display area surrounding the display area. In some implementations, Each pixel unit includes a plurality of sub-pixels with different colors. For example, each pixel unit may include a red sub-pixel, a green sub-pixel, and a blue sub-pixel, so that red, green, and blue may be mixed to implement a color display. Alternatively, each pixel unit may include a red sub-pixel, a green sub-pixel, a blue sub-pixel, and a white sub-pixel, so that red, green, blue, and white may be mixed to implement a color display. Certainly, in practical applications, the colors of light emitted by the sub-pixels in the pixel unit may be determined according to practical application environments, and is not limited herein.

In some implementations, the photosensitive area is disposed in the display area, the photosensitive area is provided therein with pixel units, and a rest area of the display area except the photosensitive area is also provided therein with pixel units. Alternatively, in order to improve the transmittance, a density of the pixel units in the photosensitive area may be smaller than a density of the pixel units in the rest area of the photosensitive area.

Light-emitting diodes, such as organic light-emitting diodes (OLEDs), quantum dot light-emitting diodes (QLEDs), micro light-emitting diodes (Micro LEDs), and mini light-emitting diodes (Mini LEDs), have the advantages of self-luminescence, low energy consumption, and the like. In some implementations, the display panel in the embodiment of the present disclosure may be an OLED display panel. In the embodiment of the present disclosure, each sub-pixel may include a light-emitting diode and a pixel circuit for driving the light-emitting diode to emit light. In some implementations, the light-emitting diode may include: at least one of an OLED, a QLED, a Micro LED, or a Mini LED. Furthermore, the pixel circuit may generally include transistors and a capacitor.

Figure 3:
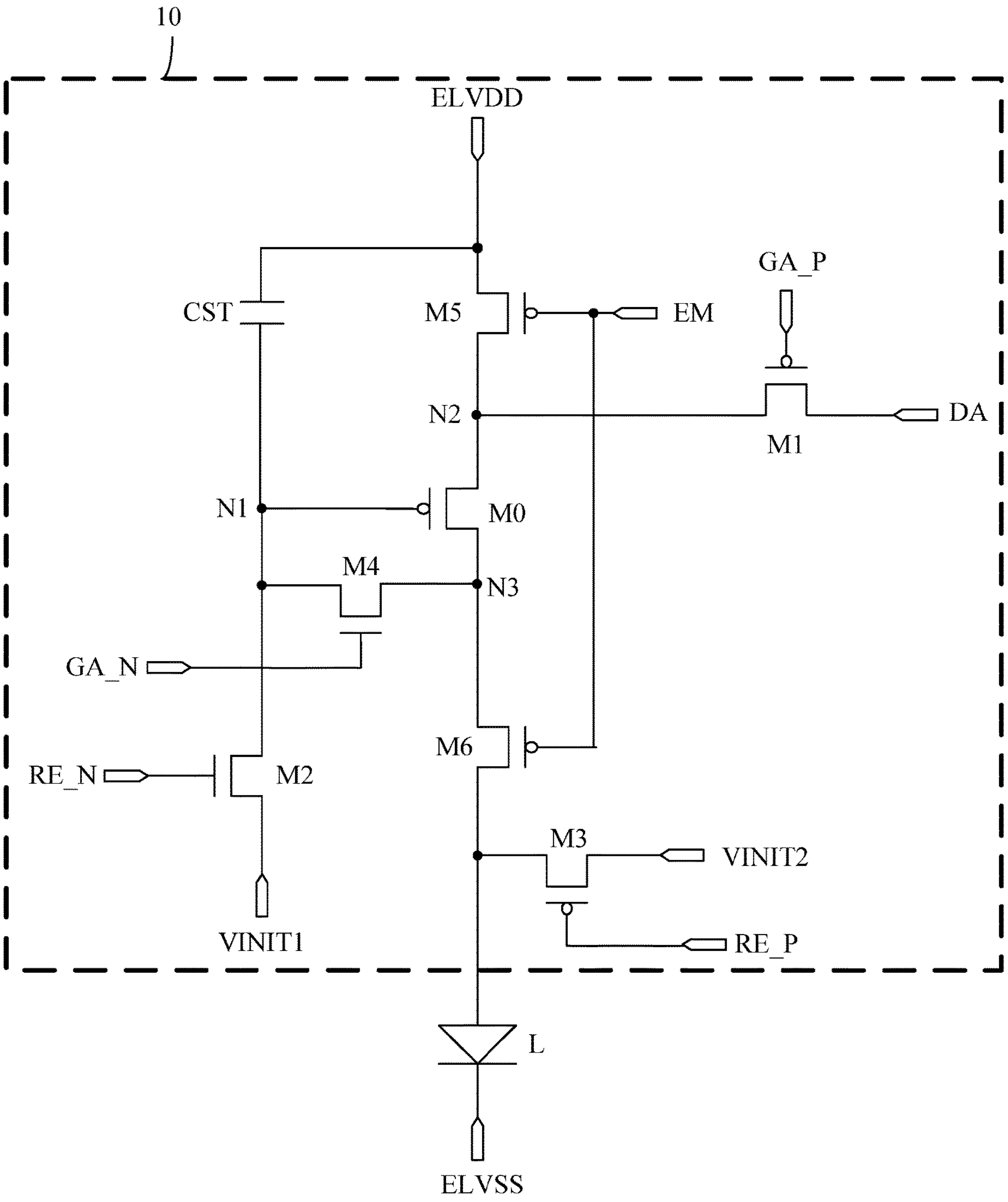
FIG. 3 is a schematic diagram of a structure of a pixel circuit according to an embodiment of the present disclosure.

In some implementations, as shown in FIG. 3, the pixel circuit 10 may include: a driving transistor M0, a data writing transistor M1, a first reset transistor M2, a second reset transistor M3, a threshold compensation transistor M4, a first light emission control transistor M5, a second light emission control transistor M6, and a storage capacitor CST. A cathode of the light-emitting diode L is electrically connected to a second power terminal ELVSS.

In some implementations, a gate of the driving transistor M0 is electrically connected to a node N1, a first electrode of the driving transistor M0 is electrically connected to a node N2, and a second electrode of the driving transistor M0 is electrically connected to a node N3. In some implementations, as shown in FIG. 3, the driving transistor M0 may be a P-type transistor; the first electrode of the driving transistor M0 may be a source thereof, and the second electrode of the driving transistor M0 may be a drain thereof. Alternatively, the driving transistor M0 may be an N-type transistor, which is not limited herein.

In some implementations, a gate of the data writing transistor M1 is electrically connected to a first scan signal terminal GA_P, a first electrode of the data writing transistor M1 is electrically connected to a data signal terminal, and a second electrode of the data writing transistor M1 is electrically connected to the node N2. In some implementations, the data writing transistor M1 is turned on under the control of an active pulse level of a first scan signal at the first scan signal terminal GA_P, and is turned off under the control of an inactive level of the first scan signal. Alternatively, as shown in FIG. 3, the data writing transistor M1 may be a P-type transistor, and the active pulse level of the first scan signal is a low level and the inactive level of the first scan signal is a high level. Alternatively, the data writing transistor may be an N-type transistor, and the active pulse level of the first scan signal is a high level, and the inactive level of the first scan signal is a low level.

In some implementations, a gate of the first reset transistor M2 is electrically connected to a first reset signal terminal RE_N, a first electrode of the first reset transistor M2 is electrically connected to a first initialization signal terminal VINIT1, and a second electrode of the first reset transistor M2 is electrically connected to the node N1. In some implementations, the first reset transistor M2 is turned on under the control of an active pulse level of a first reset signal at the first reset signal terminal RE_N and turned off under the control of an inactive level of the first reset signal. Alternatively, as shown in FIG. 3, the first reset transistor M2 may be an N-type transistor, and the active pulse level of the first reset signal is a high level and the inactive level of the first reset signal is a low level. Alternatively, the first reset transistor may be a P-type transistor, and the active pulse level of the first reset signal is a low level and the inactive level of the first reset signal is a high level.

In some implementations, a gate of the second reset transistor M3 is electrically connected to a second reset signal terminal RE_P, a first electrode of the second reset transistor M3 is electrically connected to a second initialization signal terminal VINIT2, and a second electrode of the second reset transistor M3 is electrically connected to an anode of the light-emitting diode L. In some implementations, the second reset transistor M3 is turned on under the control of an active pulse level of a second reset signal at the second reset signal terminal RE_P, and turned off under the control of an inactive level of the second reset signal. Alternatively, as shown in FIG. 3, the second reset transistor M3 may be a P-type transistor, and the active pulse level of the second reset signal is a low level and the inactive level of the second reset signal is a high level. Alternatively, the second reset transistor may be an N-type transistor, and the active pulse level of the second reset signal is a high level and the inactive level of the second reset signal is a low level.

In some implementations, a gate of the threshold compensation transistor M4 is electrically connected to a second scan signal terminal GA_N, a first electrode of the threshold compensation transistor M4 is electrically connected to the node N1, and a second electrode of the threshold compensation transistor M4 is electrically connected to the node N3. In some implementations, the threshold compensation transistor M4 is turned on under the control of an active pulse level of a second scan signal at the second scan signal terminal GA_N and turned off under the control of an inactive level of the second scan signal. Alternatively, as shown in FIG. 3, the threshold compensation transistor M4 may be an N-type transistor, and the active pulse level of the second scan signal is a high level and the inactive level of the second scan signal is a low level. Alternatively, the threshold compensation transistor may be a P-type transistor, and the active pulse level of the second scan signal is a low level, and the inactive level of the second scan signal is a high level.

In some implementations, a gate electrode of the first light emission control transistor M5 is electrically connected to a light emission control signal terminal EM, a first electrode of the first light emission control transistor M5 is electrically connected to a first power terminal ELVDD, and a second electrode of the first light emission control transistor M5 is electrically connected to the node N2. In some implementations, the first emission control transistor M5 is turned on under the control of an active pulse level of a light emission control signal at the emission control signal terminal EM, and is turned off under the control of an inactive level of the emission control signal. Alternatively, as shown in FIG. 3, the first light emission control transistor M5 may be a P-type transistor, and the active pulse level of the light emission control signal is a low level and the inactive level of the light emission control signal is a high level. Alternatively, the first light emission control transistor may be an N-type transistor, and the active pulse level of the light emission control signal is a high level, and the inactive level of the light emission control signal is a low level.

In some implementations, a gate of the second light emission control transistor M6 is electrically connected to the light emission control signal terminal EM, a first electrode of the second light emission control transistor M6 is electrically connected to the node N3, and a second electrode of the second light emission control transistor M6 is electrically connected to the anode of the light-emitting diode L. In some implementations, the second emission control transistor M6 is turned on under the control of an active pulse level of the light emission control signal at the emission control signal terminal EM, and is turned off under the control of an inactive level of the light emission control signal. Alternatively, as shown in FIG. 3, the second light emission control transistor M6 may be a P-type transistor, and the active pulse level of the light emission control signal is a low level and the inactive level of the light emission control signal is a high level. Alternatively, the second light emission control transistor may be an N-type transistor, and the active pulse level of the light emission control signal is a high level and the inactive level of the light emission control signal is a low level.

A first electrode of the storage capacitor CST is electrically connected to the node N1, and a second electrode of the storage capacitor CST is electrically connected to the first power terminal ELVDD.

In some implementations of the present disclosure, the first power terminal ELVDD may be configured to be loaded with a constant first power voltage, and the first power voltage is generally a positive power voltage. Furthermore, the second power terminal ELVSS may be applied with a constant second power voltage, and the second power voltage may be generally a ground voltage or a negative power voltage. In practical applications, the first power voltage and the second power voltage may be determined as desired, which is not limited herein.

In some implementations of the present disclosure, the first electrode of the transistor may be used as a source thereof and a second electrode of the transistor may be used as a drain thereof, depending on the type of the transistor and the signal at the gate of the transistor; or, conversely, the first electrode of the transistor may be used as the drain thereof, and the second electrode may be used as the source thereof, which may be determined as desired, and is not specifically limited herein.

The foregoing is merely an example of a specific structure of the pixel circuit provided in the embodiment of the present disclosure, and in a specific implementation, the pixel circuit is not limited to the structure described above in the embodiment of the present disclosure, and may further be other structures known to a person skilled in the art, which are within the protection scope of the present disclosure and are not limited herein.

Figure 4:
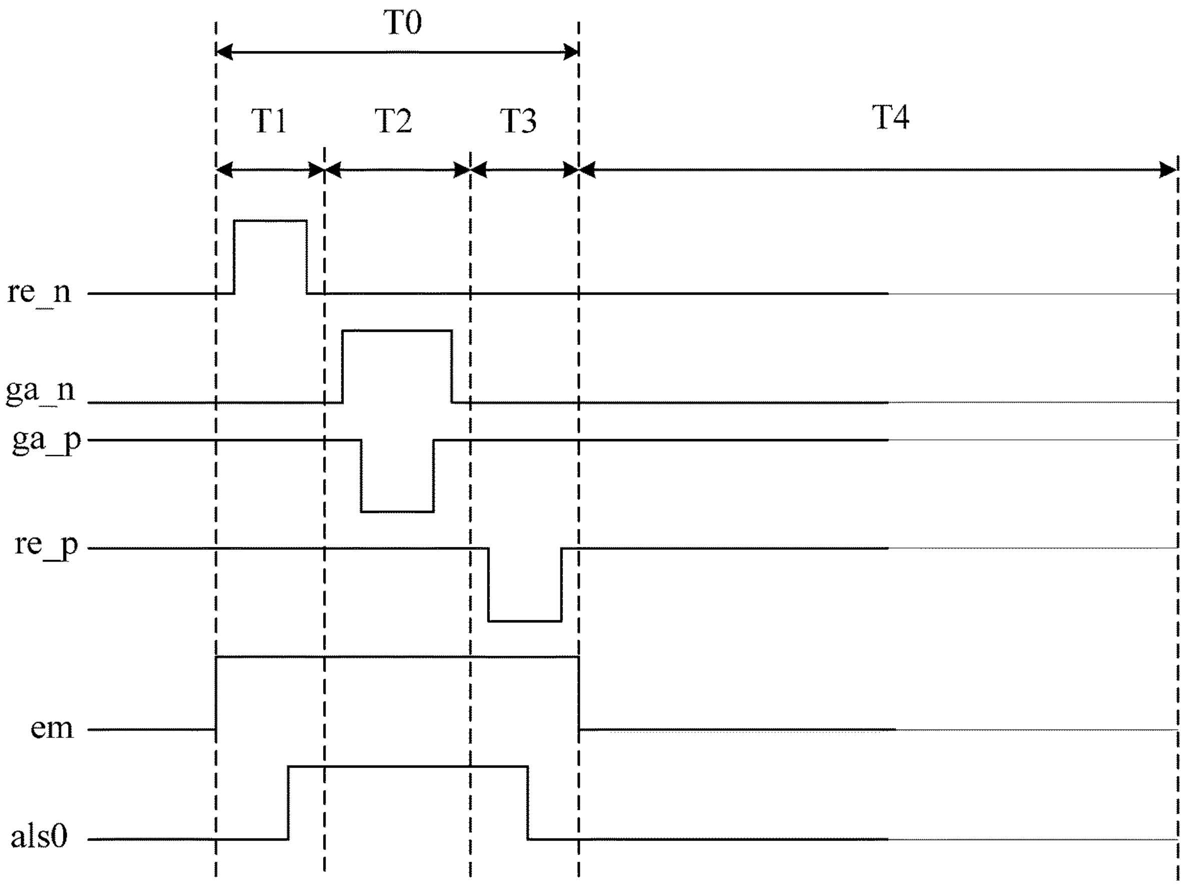
FIG. 4 is shows a timing diagram of some signals according to an embodiment of the present disclosure.

In some examples, the structure of the pixel circuit shown in FIG. 3 is taken as an example, and an operation process, during one display frame, of the pixel circuit according to the embodiment of the present disclosure is described below with reference to the timing diagram of signals shown in FIG. 4. A non-light-emitting period T0 and a light-emitting period T4 in one display frame in the timing diagram of signals shown in FIG. 4 are mainly selected to be described.

In the timing diagram, T4 represents the light-emitting period, and the non-light-emitting period T0 includes a reset phase T1, a data writing phase T2 and an initialization phase T3. Re_n represents the first reset signal applied to the first reset signal terminal RE_N, ga_n represents the second scan signal applied to the second scan signal terminal GA_N, ga_p represents the first scan signal applied to the first scan signal terminal GA_P, re_p represents the second reset signal applied to the second reset signal terminal RE_P, and em represents the light emission control signal applied to the light emission control signal terminal EM.

In the reset phase T1, the first reset transistor M2 is turned on, and a first initialization voltage at the first initialization signal terminal VINIT1 is input to the node N1, so that the node N1 is reset. In this phase, the first light emission control transistor M5 and the second light emission control transistor M6 are turned off, and the light-emitting diode L does not emit light.

In the data writing phase T2, the data writing transistor M1 and the threshold compensation transistor M4 are turned on, a data voltage Vda applied to the data signal terminal DA is input to the node N2 to charge the node N1 through the driving transistor M0 serving as a diode, so that a voltage of the node N1 is changed to Vda+Vth. Vth represents a threshold voltage of the driving transistor M0. In this phase, the first light emission control transistor M5 and the second light emission control transistor M6 are turned off, and the light-emitting diode L does not emit light.

In the initialization phase T3, the second reset transistor M3 is turned on, and a second initialization voltage of the second initialization signal terminal VINIT2 is input to the anode of the light-emitting diode L to initialize the anode of the light-emitting diode L. In this phase, the first light emission control transistor M5 and the second light emission control transistor M6 are turned off, and the light-emitting diode L does not emit light.

In the light-emitting period T4, the first light emission control transistor M5 and the second light emission control transistor M6 are turned on, the voltage of the node N2 is changed to the first power voltage Velvdd, the voltage of the N1 node is still Vda+Vth, and the driving transistor M0 generates a current IL, and $IL=k(Vda-Velvdd)^2$, where k is a structural parameter. The current IL is input into the light-emitting diode L to drive the light-emitting diode L to emit light.

As shown in FIG. 4, it can be known from the operation process of the pixel circuit in one display frame that, in the display frame, the sub-pixel first enters the non-light-emitting period T0, and then enters the light-emitting period T4. That is, a duration of one display frame includes the non-light-emitting period T0 and the light-emitting period T4.

In practical applications, generally, during the non-light-emitting period (i.e., a period from a beginning of the reset phase T1 to an end of the initialization phase T3) in which a first inactive pulse (e.g., a pulse corresponding to a high level) occurs in the light emission control signal, the driving circuit controls the photosensitive elements to collect a light intensity signal. For example, as shown in FIG. 4, als0 represents a collection control signal for controlling the photosensitive elements, and when the light emission control signal EM is at a high level, the collection control signal als0 is at a high level, and the photosensitive elements are controlled to collect the light intensity signal. However, a rising edge and a falling edge of the first inactive pulse of the light emission control signal EM each have a delay, resulting to a short duration that the collection control signal als0 is at the high level, and thus the photosensitive elements cannot have enough time to collect the light intensity signal, and the accuracy of the collected light intensity signal is reduced.

Figure 5:
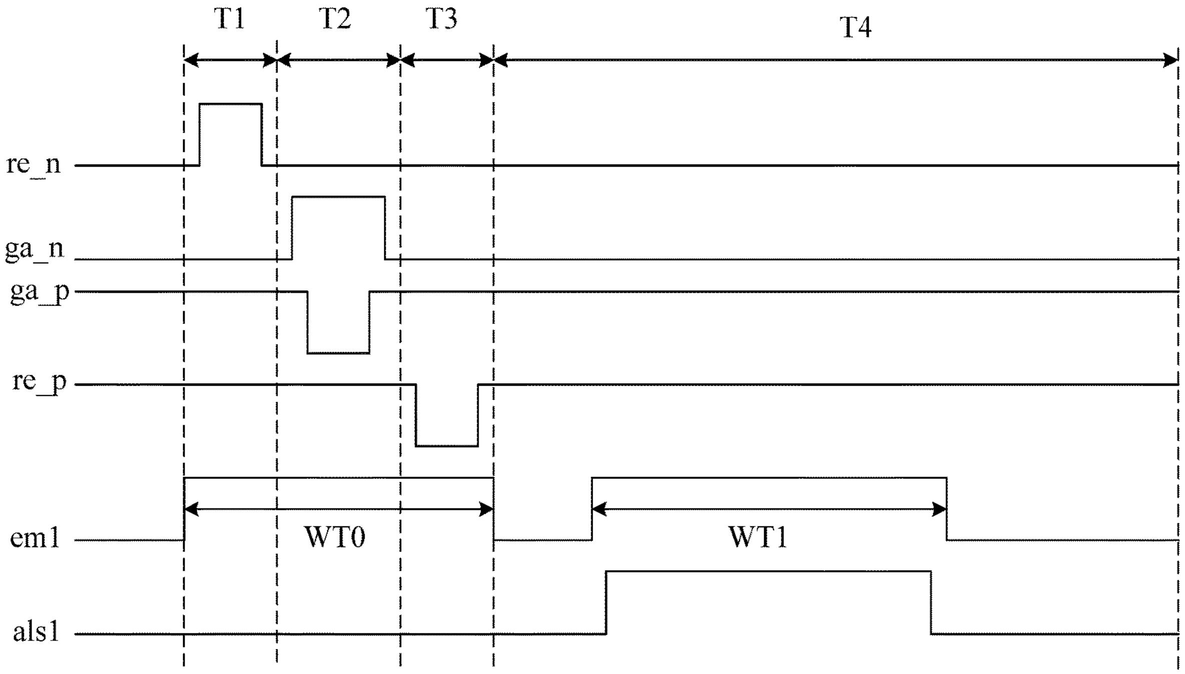
FIG. 5 shows a timing diagram of some signals according to an embodiment of the present disclosure.

In order to improve the accuracy of the light intensity signal collected by the photosensitive elements, in the embodiment of the present disclosure, the driving circuit controls each sub-pixel in the photosensitive area to be in a non-light-emitting state during the light-emitting period of a preset display frame, and controls each photosensitive element in the photosensitive area to collect the light intensity signal of incident light in response to the fact that each sub-pixel in the photosensitive area is in the non-light-emitting state during the light-emitting period of the preset display frame. Therefore, by controlling the sub-pixels in the photosensitive area to be in the non-light-emitting state during the light-emitting period of the preset display frame, the duration that each sub-pixel in the photosensitive area is in the non-light-emitting state may be adjusted. For example, the duration that each sub-pixel in the photosensitive area is in the non-light-emitting state is prolonged, so that each photosensitive element is controlled to collect the light intensity signal of the incident light in the prolonged duration, the photosensitive elements may effectively collect the light intensity signal, and the accuracy of the collected light intensity signal is improved. In some implementations, as shown in FIG. 5, als1 represents a collection control signal for controlling the photosensitive elements, and in response to the fact that each sub-pixel in the photosensitive area is controlled to be in the non-light-emitting state during the light-emitting period T4 of the preset display frame, the collection control signal als1 is at a high level, so that each photosensitive element is controlled to collect the light intensity signal.

For example, in a case where the photosensitive element array is an array of ambient light sensors (ALS), the light intensity signal of the incident light collected by the photosensitive elements may be an ambient light signal, so that the display brightness of the display panel may be adjusted according to the collected ambient light signal. In the embodiment of the present disclosure, the accuracy of the collected light intensity signal can be improved, so that the accuracy of the collected ambient light signal can be improved. Furthermore, the accuracy of adjustment of the display brightness of the display panel can be improved, and the display brightness of the display panel can be automatically adjusted.

In some implementations, in a case where the photosensitive element array is the photodetector array in the camera, the photographing and video recording functions may be implemented according to the collected light intensity signal. In the embodiment of the present disclosure, the accuracy of the collected light intensity signal can be improved, so that the definition of photographing and video recording can be improved.

For example, in a case where the photosensitive element array is a fingerprint recognization detector array, the light intensity signal of incident light collected by the photosensitive elements may be a light intensity signal of light reflected by a finger, so that fingerprint recognization may be performed according to the collected light intensity signal of light reflected by the finger. In the embodiment of the present disclosure, the accuracy of the collected light intensity signal can be improved, so that the accuracy of the collected light intensity signal of light reflected by the finger can be improved, and the accuracy of finger recognization can be improved.

In the embodiment of the present disclosure, the sub-pixel being in the non-light-emitting state means that the sub-pixel does not emit light. That is, the light-emitting diode in the sub-pixel does not emit light.

In some implementations of the present disclosure, as shown in FIG. 2*a*, the display panel may include a first area aa1 and a second area aa2 sequentially arranged in a column direction of the sub-pixels, the first area aa1 including a photosensitive area ALSB. The driving circuit is further configured to control each photosensitive element in the photosensitive area to collect the light intensity signal of the incident light during controlling each sub-pixel in the first area aa1 to be in the non-light-emitting state in the light-emitting period of a preset display frame. Therefore, the duration of each sub-pixel in the first area aa1 being in the non-light-emitting state can be adjusted, for example, the duration of each sub-pixel in the first area aa1 being in the non-light-emitting state is prolonged, so that each photosensitive element is controlled to collect the light intensity signal of the incident light in the prolonged duration, each photosensitive element can effectively collect the light intensity signal, and the accuracy of the collected light intensity signal can be improved.

For example, the light emission control signal may have an inactive pulse in the light-emitting period to control the sub-pixel not to emit light. In a practical implementation, the driving circuit is further configured to control the light emission control signal corresponding to each sub-pixel in the first area aa1 to have an inactive pulse with a first duration in the light-emitting period, so that each sub-pixel in the first area aa1 is in the non-light-emitting state in the light-emitting period. A level of the inactive pulse of the light emission control signal is used for controlling the light emission control transistor in the display panel to be turned off, the first duration is longer than a duration of the non-light-emitting period of each sub-pixel, and the non-light-emitting period occurs before the light-emitting period. Therefore, the duration of each sub-pixel in the first area aa1 being in the non-light-emitting state can be prolonged, so that each photosensitive element is controlled to collect the light intensity signal of incident light in the prolonged duration, each photosensitive element can effectively collect the light intensity signal, and the accuracy of the collected light intensity signal can be improved.

For example, referring to FIG. 5, em1 represents a light emission control signal corresponding to the sub-pixel in the first area aa1, and a level (e.g., a high level) of an inactive pulse of the light emission control signal em1 is used to control the light emission control transistors (e.g., the first light emission control transistor M5 and the second light emission control transistor M6) in the first area aa1 to be turned off. The inactive pulse (e.g., a pulse corresponding to the high level) in the light-emitting period T4 is used to control the light emission control transistors (e.g., the first light emission control transistor M5 and the second light emission control transistor M6) in the first area aa1 to be turned off, so that each sub-pixel in the first area aa1 is in the non-light-emitting state in the light-emitting period T4. Furthermore, the first duration WT1 is longer than the duration WT0 of the non-light-emitting period of each sub-pixel. Therefore, the duration of each sub-pixel in the first area aa1 being in the non-light-emitting state can be prolonged, so that each photosensitive element is controlled to collect the light intensity signal of incident light in the prolonged duration, each photosensitive element can effectively collect the light intensity signal, and the accuracy of the collected light intensity signal can be improved.

For example, as shown in FIG. 5, for a preset display frame, the light emission control signal em1 corresponding to each sub-pixel in the first area aa1 may have one inactive pulse (e.g., an inactive pulse with a high level) in the light-emitting period T4, the inactive pulse being an inactive pulse with a first duration.

Figure 6A:
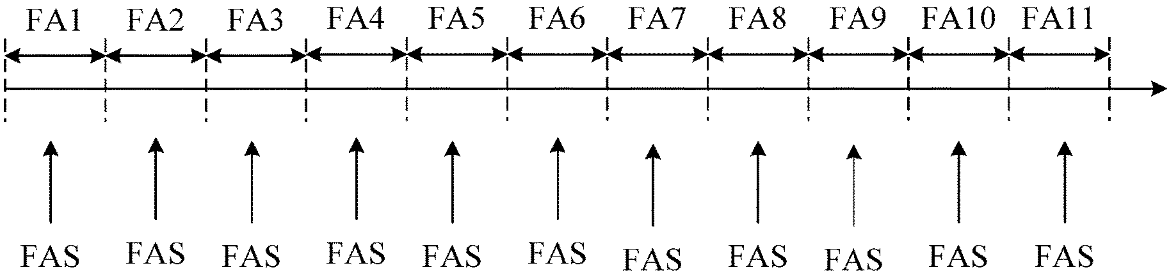
FIG. 6*a* is a schematic diagram of some display frames according to an embodiment of the present disclosure.

In some implementations of the present disclosure, each of a plurality of adjacent display frames may be the preset display frame. For example, as shown in FIG. 6*a*, taking eleven adjacent display frames FA1 to FA11 as an example, each of the eleven display frames FA1 to FA11 is specified as a preset display frame FAS.

Figure 6B:
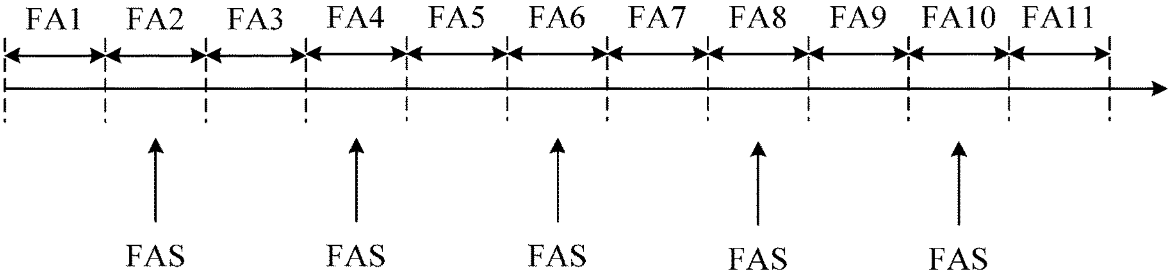
FIG. 6*b* is a schematic diagram of some display frames according to an embodiment of the present disclosure.

In some implementations of the present disclosure, at least two display frames of the plurality of adjacent display frames each may be specified as the preset display frame, and at least one remaining display frame other than the preset display frames may be provided between every two adjacent preset display frames. In some implementations, one remaining display frame other than the preset display frames may be provided between every two adjacent preset display frames. For example, as shown in FIG. 6*b*, taking the eleven adjacent display frames FA1 to FA11 as an example, a display frame FA2, a display frame FA4, a display frame FA6, a display frame FA8 and a display frame FA10 are specified as the preset display frames FAS, and a display frame FA1, a display frame FA3, a display frame FA5, a display frame FA7, a display frame FA9 and a display frame FA11 each is the remaining display frame other than the preset display frames.

In some implementations of the present disclosure, the driving circuit is further configured to control, during each of the remaining display frames other than the preset display frames, each sub-pixel in the display panel to be input with a data voltage corresponding a grayscale, so as to control the display panel to display an image. For example, for the remaining display frames (such as the display frame FA1, the display frame FA3, the display frame FA5, the display frame FA7, the display frame FA9 and the display frame FA 11), the driving circuit may drive each sub-pixel in the display panel to perform an operation process of each display frame based on the first reset signal re_n, the second reset signal re_p, the first scan signal ga_p, the second scan signal ga_n and the light emission control signal em in the timing diagram of signals shown in FIG. 4, so as to display an image. In practical an implementation, the driving circuit is further configured to control the light emission control signals corresponding to the sub-pixels in the first and second areas aa1 and aa2 to be the same during each of the remaining display frames other than the preset display frames.

In some implementations of the present disclosure, the driving circuit is further configured to control each of the sub-pixels in the first area and the second area of the display panel to be input with a data voltage corresponding to a grayscale during each preset display frame. For example, during each preset display frame, the driving circuit may drive each sub-pixel in the first area aa1 of the display panel to be input with the data voltage corresponding to the grayscale based on the timing diagram of signals shown in FIG. 5, so as to perform the operation process of each display frame. Furthermore, the driving circuit may drive each sub-pixel in the second area aa2 of the display panel to be input with the data voltage corresponding to the grayscale based on the first reset signal re_n, the second reset signal re_p, the first scan signal ga_p, the second scan signal ga_n and the light emission control signal em in the timing diagram of signals shown in FIG. 4, so as to perform the operation process of each display frame.

Since Vda of the gate voltage Vda+Vth of the driving transistor M0 is a data voltage corresponding to a zero grayscale, the current IL generated by the driving transistor M0 is minimized and is not enough to drive the light-emitting diode L to emit light, so that each sub-pixel in the photosensitive area may be directly in the non-light-emitting state during the light-emitting period. In some implementations of the present disclosure, in a case where there are at least two preset display frames in the plurality of adjacent display frames, the driving circuit is further configured to control each sub-pixel in the photosensitive area to be input with the data voltage corresponding to a zero grayscale during each preset display frame.

In some implementations of the present disclosure, in a case where there are at least two preset display frames in the plurality of adjacent display frames, the driving circuit is further configured to control each sub-pixel in the photosensitive area to be input with a data voltage corresponding to the zero grayscale during each preset display frame. Alternatively, the driving circuit is further configured to control each sub-pixel in the photosensitive area to be input with a data voltage corresponding to a grayscale during each preset display frame. Furthermore, the driving circuit is further configured to control each sub-pixel in a remaining area other than the photosensitive area to be input with a data voltage corresponding to a corresponding grayscale or to control each sub-pixel in the remaining area other than the photosensitive area to hold the data voltage during each preset display frame.

Furthermore, in a case where there are at least two preset display frames in the plurality of adjacent display frames, the driving circuit is further configured to control each sub-pixel in the first area to be input with a data voltage corresponding to a zero grayscale during each preset display frame. Alternatively, the driving circuit is further configured to control each of the sub-pixels in the first area to be input with a data voltage corresponding to a corresponding grayscale during each display frame. Furthermore, the driving circuit is further configured to control each sub-pixel in the second area to be input with a data voltage corresponding to a corresponding grayscale or control each sub-pixel in the second area to hold the data voltage during each preset display frame.

For example, during each preset display frame, the driving circuit may drive each sub-pixel in the first area aa1 of the display panel to be input with a data voltage corresponding to a corresponding grayscale or a data voltage corresponding to a zero grayscale based on the first reset signal re_n, the second reset signal re_p, the first scan signal ga_p, the second scan signal ga_n and the light emission control signal em1 in the timing diagram of signals shown in FIG. 5, so as to perform the operation process of each display frame. Furthermore, the driving circuit may drive each sub-pixel in the second area aa2 of the display panel to be input with a data voltage corresponding to a corresponding grayscale based on the first reset signal re_n, the second reset signal re_p, the first scan signal ga_p, the second scan signal ga_n and the light emission control signal em in the timing diagram of signals shown in FIG. 4, so as to perform the operation process of each display frame.

For example, in each remaining display frame other than the preset display frame, the driving circuit may drive each sub-pixel in the first area aa1 of the display panel to be input with a data voltage corresponding to a corresponding grayscale based on the first reset signal re_n, the second reset signal re_p, the first scan signal ga_p, the second scan signal ga_n and the light emission control signal em in the timing diagram of signals shown in FIG. 4, so as to perform the operation process of each display frame. Furthermore, the driving circuit may drive each sub-pixel in the second area aa2 of the display panel to be input with a data voltage corresponding to a corresponding grayscale based on the first reset signal re_n, the second reset signal re_p, the first scan signal ga_p, the second scan signal ga_n and the light emission control signal em in the timing diagram of signals shown in FIG. 4, so as to perform the operation process of each display frame.

In some implementations, during each preset display frame, the driving circuit controls each sub-pixel in the second area of the display panel to be in a state of holding the data voltage. Alternatively, each sub-pixel in the second area may not be input with a corresponding data voltage, so that each sub-pixel in the second area is in the state of holding the data voltage, thereby reducing power consumption. For example, during each preset display frame, the driving circuit may drive each sub-pixel in the first area aa1 of the display panel to perform an operation process of each display frame based on the timing diagram of signals shown in FIG. 5. Furthermore, the driving circuit stops outputting the light emission control signal to each sub-pixel in the second area aa2. In this way, the power consumption can be reduced. Furthermore, the driving circuit stops outputting the first reset signal re_n, the second reset signal re_p, the first scan signal ga_p, and the second scan signal ga_n to each sub-pixel in the second area aa2. In this way, the sub-pixels in the remaining area of the display panel may be controlled to be in the state of holding the data voltage, and the power consumption may be further reduced.

Figure 7:
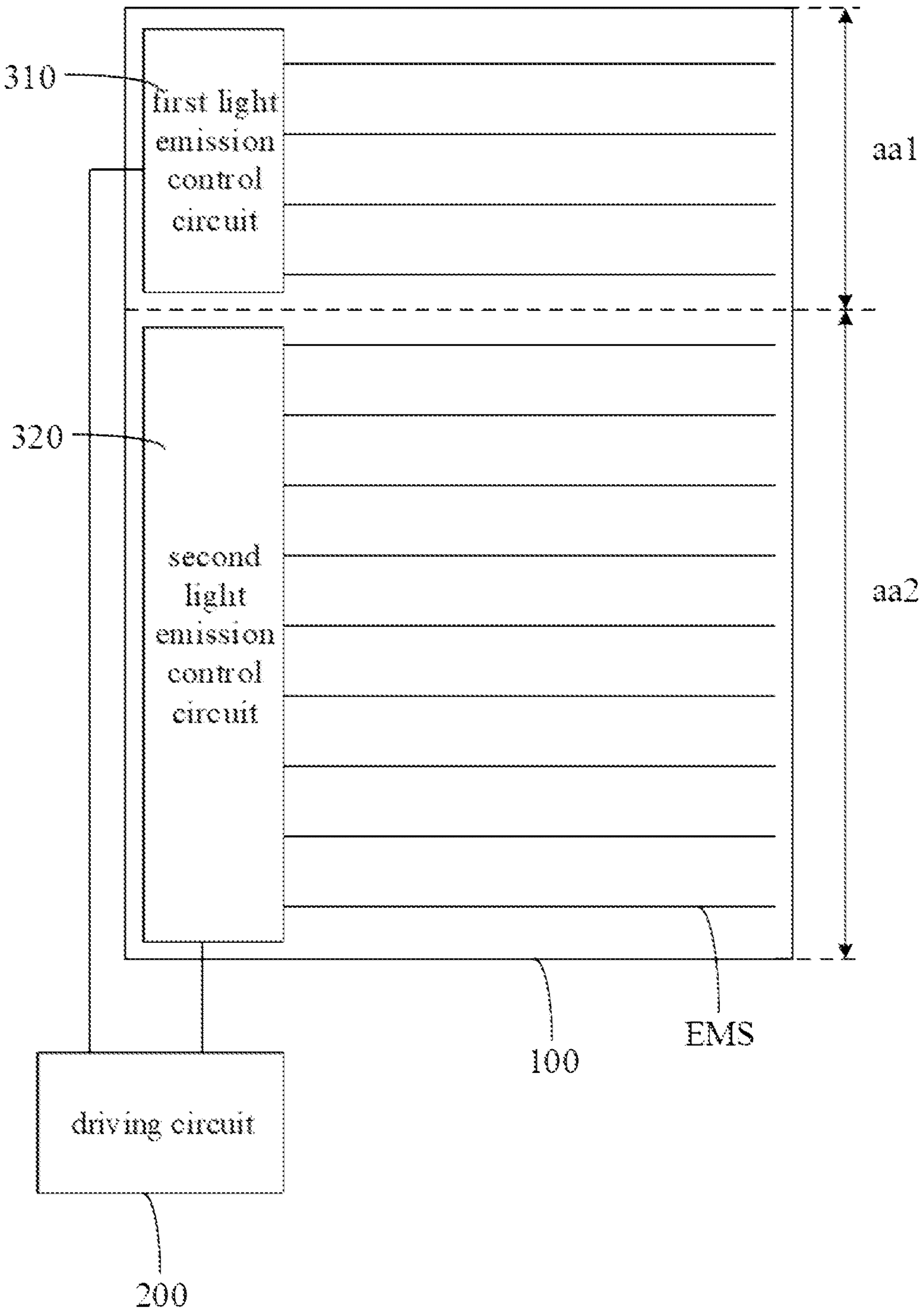
FIG. 7 is a schematic cross-sectional diagram of a structure of a display panel according to an embodiment of the present disclosure.

In some implementations of the present disclosure, as shown in FIG. 7, the display panel 100 further includes a plurality of light emission control signal lines EMS in the display area, and the light emission control signal terminals EM of the pixel circuits in each row of sub-pixels are electrically connected to one of the light emission control signal lines EMS, so that a corresponding light emission control signal is input to the light emission control signal terminals EM electrically connected with the light emission control signal line EMS through the light emission control signal line EMS.

In some implementations of the present disclosure, as shown in FIG. 7, the display panel further includes a first light emission control circuit 310 and a second light emission control circuit 320 in the non-display area. The first light emission control circuit 310 is electrically connected to the light emission control signal lines EMS in the first area aa1, therefore, the first light emission control circuit 310 is electrically connected with the sub-pixels in the first area aa1. Furthermore, the second light emission control circuit 320 is electrically connected to the light emission control signal lines EMS in the second area aa2, therefore, the second light emission control circuit 320 is electrically connected with the sub-pixels in the second area aa2.

In some implementations of the present disclosure, the driving circuit is further configured to control the first light emission control circuit 310 to output corresponding light emission control signals to the sub-pixels in the first area aa1, and to control the second light emission control circuit 320 to output corresponding light emission control signals to the sub-pixels in the second area aa2.

Figure 8:
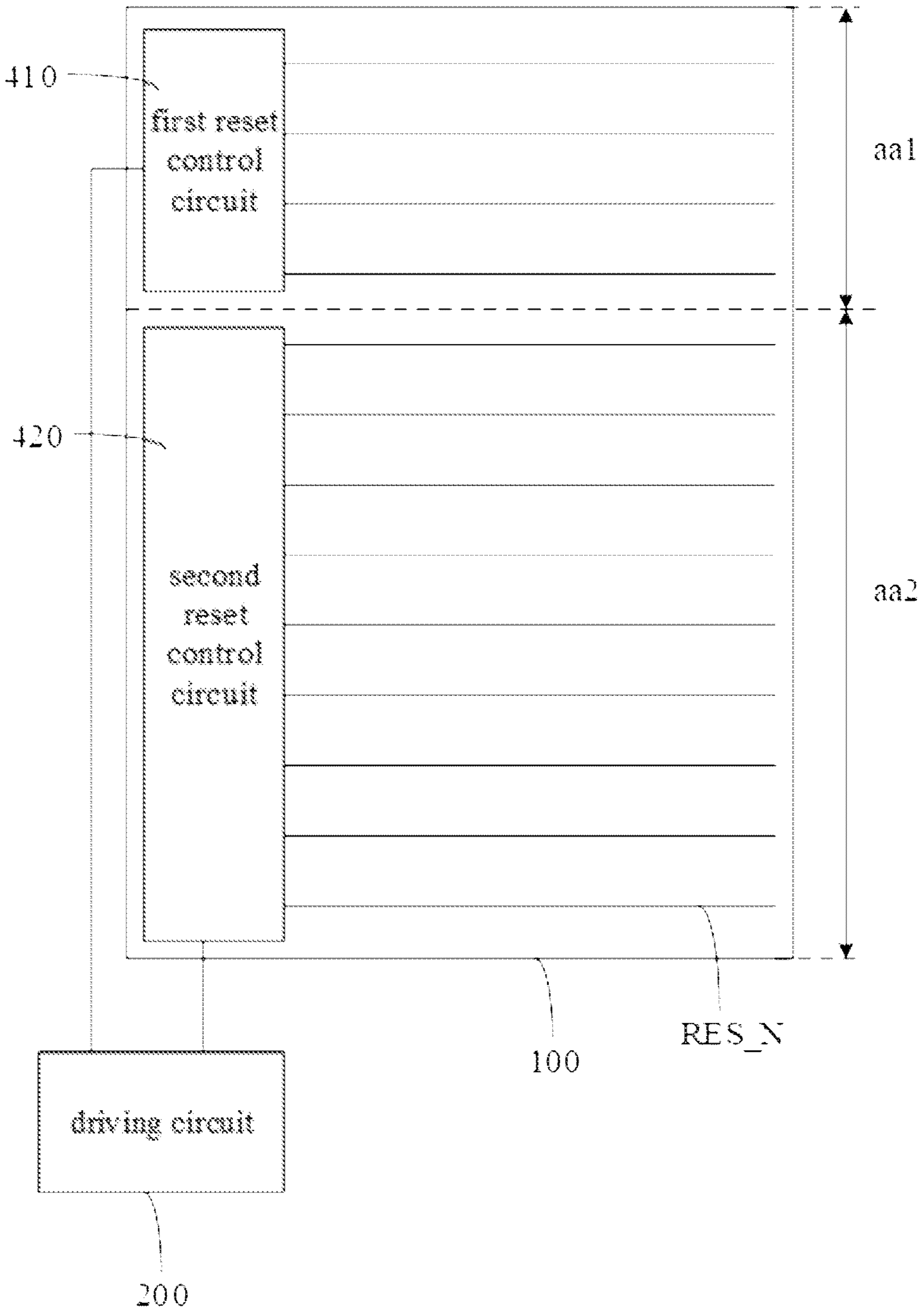
FIG. 8 is a schematic cross-sectional diagram of a structure of a display panel according to an embodiment of the present disclosure.

In some implementations of the present disclosure, as shown in FIG. 8, the display panel 100 further includes a plurality of first reset signal lines RES_N in the display area, and the first reset signal terminals RE_N of the pixel circuits in each row of sub-pixels are electrically connected to one of the first reset signal lines RES_N, so that a corresponding first reset signal is input to the first reset signal terminals through the first reset signal line RES_N electrically connected to the first reset signal terminals.

In some implementations of the present disclosure, as shown in FIG. 8, the display panel further includes a first reset control circuit 410 and a second reset control circuit 420 in the non-display area. The first reset control circuit 410 is electrically connected to the first reset signal lines RES_N in the first area aa1, so that the first reset control circuit 410 is electrically connected with the sub-pixels in the first area aa1. Furthermore, the second reset control circuit 420 is electrically connected to the first reset signal lines RES_N in the second area aa2, so that the second reset control circuit 420 is electrically connected with the sub-pixels in the second area aa2.

In some implementations of the present disclosure, the driving circuit is further configured to control the first reset control circuit 410 to output a corresponding first reset signal to each sub-pixel in the first area aa1, and to control the second reset control circuit 420 to output a corresponding first reset signal to each sub-pixel in the second area aa2.

Figure 9:
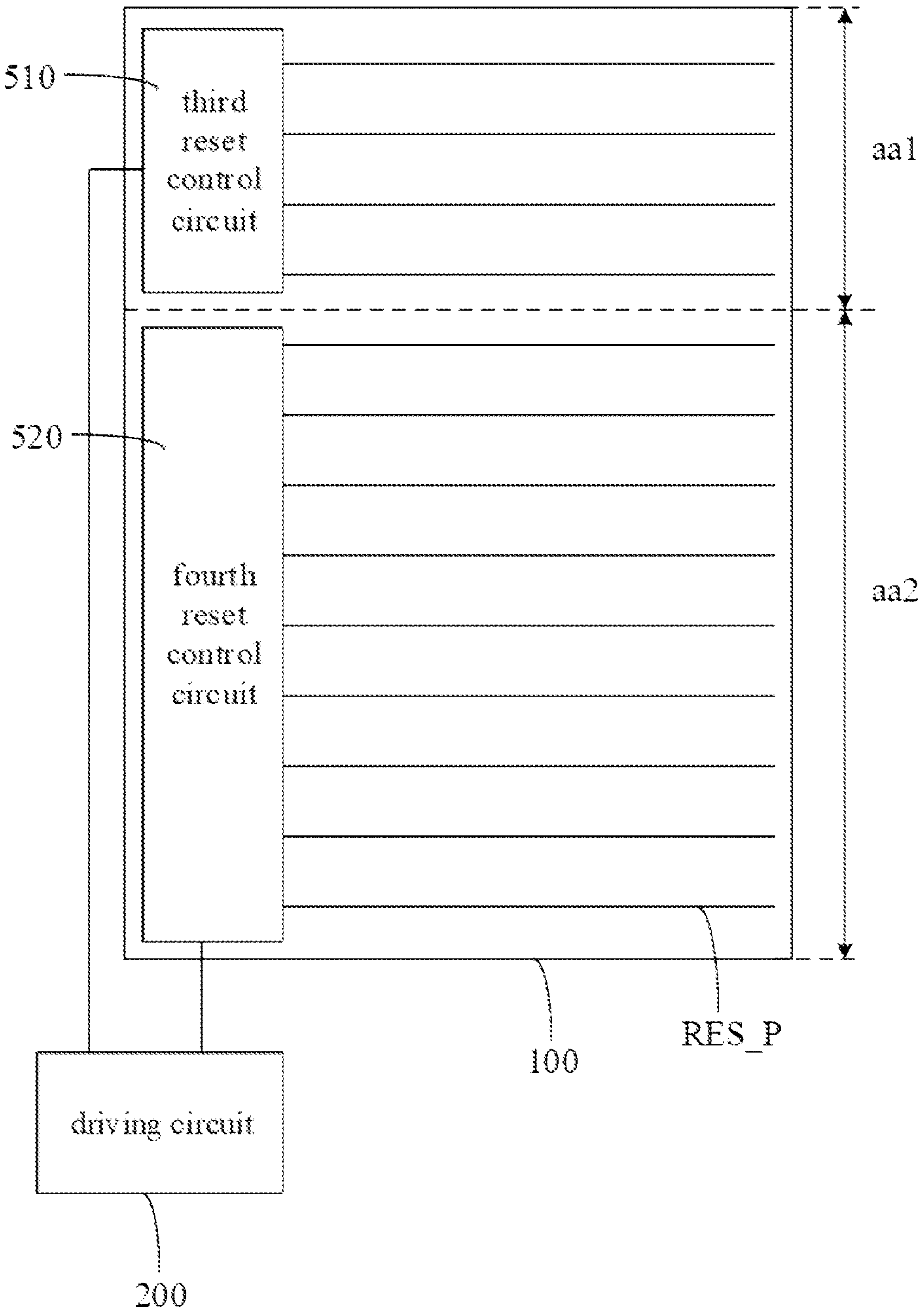
FIG. 9 is a schematic cross-sectional diagram of a structure of a display panel according to an embodiment of the present disclosure.

In some implementations of the present disclosure, as shown in FIG. 9, the display panel 100 further includes a plurality of second reset signal lines RES_P in the display area, and the second reset signal terminals RE_P of the pixel circuits in each row of sub-pixels are electrically connected to one of the second reset signal lines RES_P, so that a corresponding second reset signal is input to the second reset signal terminals through the second reset signal line RES_P electrically connected with the second reset signal terminals.

In some implementations of the present disclosure, as shown in FIG. 9, the display panel further includes a third reset control circuit 510 and a fourth reset control circuit 520 in the non-display area. The third reset control circuit 510 is electrically connected to the second reset signal lines RES_P in the first area aa1, so that the third reset control circuit 510 is electrically connected with the sub-pixels in the first area aa1. Furthermore, the fourth reset control circuit 520 is electrically connected to the second reset signal lines RES_P in the second area aa2, so that the fourth reset control circuit 520 is electrically connected with the sub-pixels in the second area aa2.

In some implementations of the present disclosure, the driving circuit is further configured to control the third reset control circuit 510 to output a corresponding second reset signal to each sub-pixel in the first area aa1, and to control the fourth reset control circuit 520 to output a corresponding second reset signal to each sub-pixel in the second area aa2.

Figure 10:
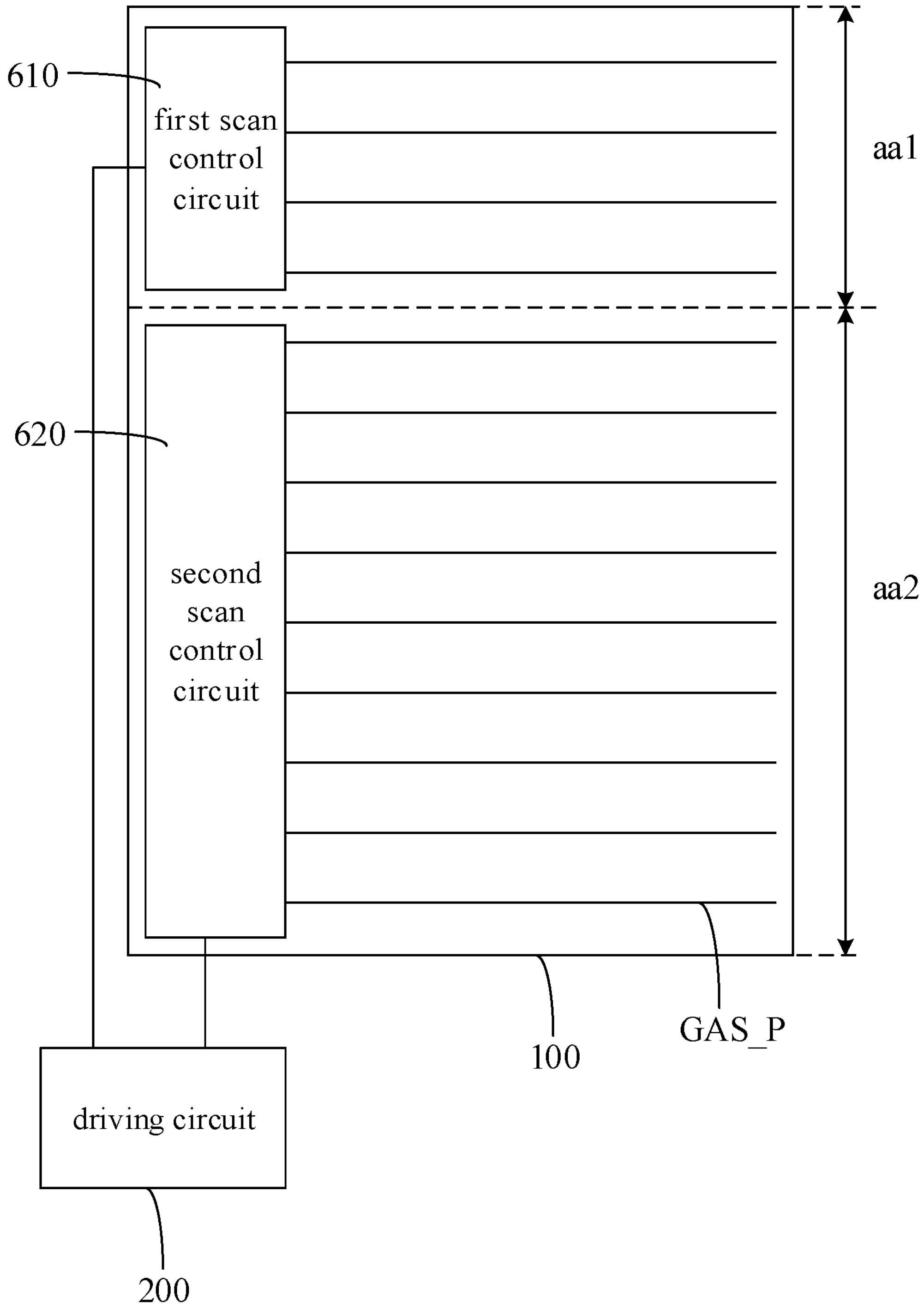
FIG. 10 is a schematic cross-sectional diagram of a structure of a display panel according to an embodiment of the present disclosure.

In some implementations of the present disclosure, as shown in FIG. 10, the display panel 100 further includes a plurality of first scan signal lines GA_P in the display area, and the first scan signal terminals GA_P of the pixel circuits in a row of sub-pixels are electrically connected to one of the first scan signal lines GA_P, so that a corresponding first scan signal is input to the first scan signal terminals GA_P through the first scan signal line GA_P electrically connected with the first scan signal terminals GA_P.

In some implementations of the present disclosure, as shown in FIG. 10, the display panel 100 further includes a plurality of first scan signal lines GAS_P in the display area, and the first scan signal terminals GA_P of the pixel circuits in a row of sub-pixels are electrically connected to one of the first scan signal lines GAS_P, so that a corresponding first scan signal is input to the first scan signal terminals GA_P through the first scan signal line GAS_P electrically connected with the first scan signal terminals GA_P.

In some implementations of the present disclosure, as shown in FIG. 10, the display panel further includes a first scan control circuit 610 and a second scan control circuit 620 in the non-display area. The first scan control circuit 610 is electrically connected to the first scan signal lines GAS_P in the first area aa1, so that the first scan control circuit 610 is electrically connected to the sub-pixels in the first area aa1. Furthermore, the second scan control circuit 620 is electrically connected to the first scan signal lines GAS_P in the second area aa2, so that the second scan control circuit 620 is electrically connected to the sub-pixels in the second area aa2.

Figure 11:
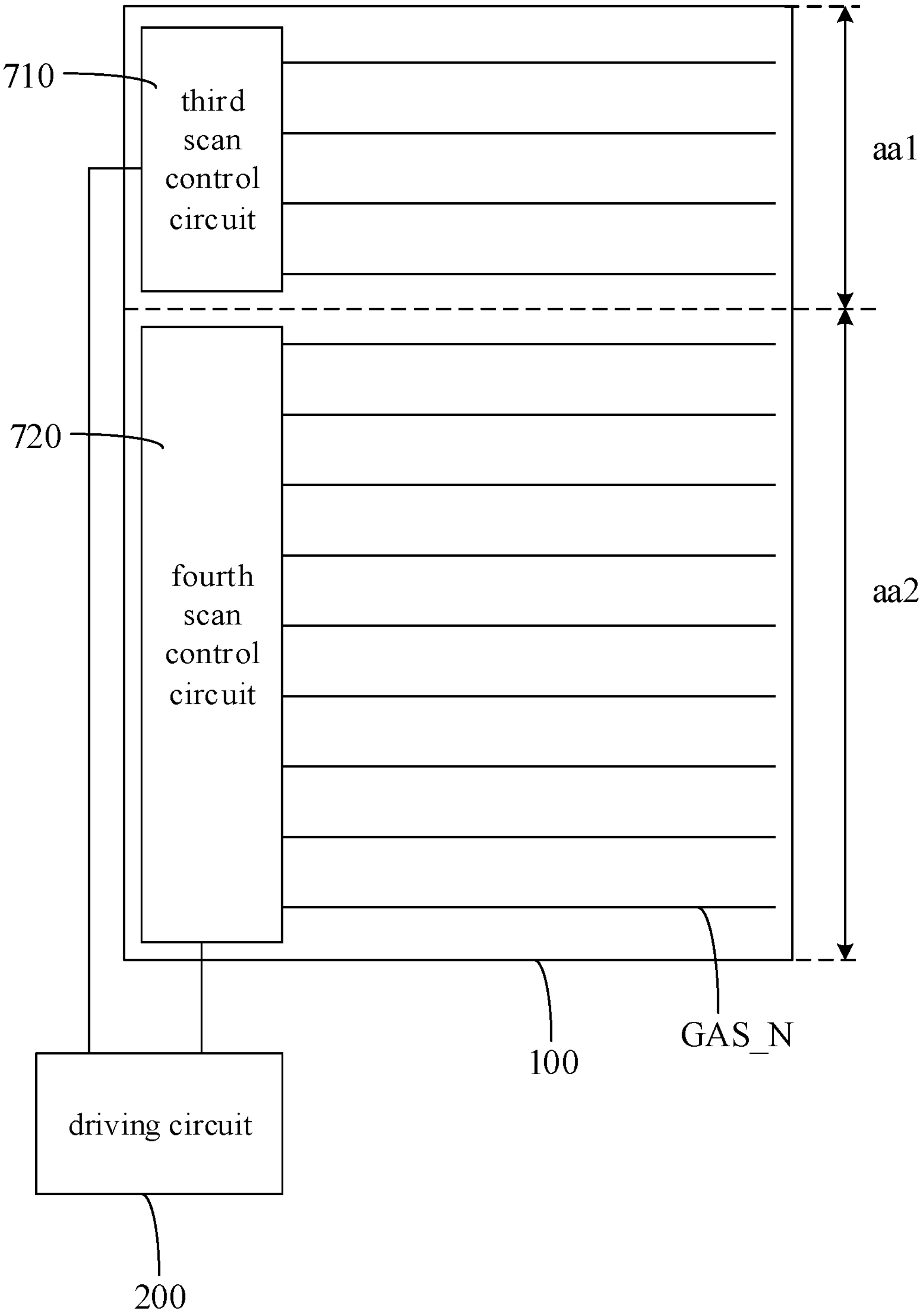
FIG. 11 is a schematic cross-sectional diagram of a structure of a display panel according to an embodiment of the present disclosure.

In some implementations of the present disclosure, as shown in FIG. 11, the display panel 100 further includes a plurality of second scan signal lines GAS_N in the display area, and the second scan signal terminals GA_N of the pixel circuits in a row of sub-pixels are electrically connected to one of the second scan signal lines GAS_N, so that a corresponding second scan signal is input to the second scan signal terminals GA_N through the second scan signal line GAS_N electrically connected with the second scan signal terminals GA_N.

In some implementations of the present disclosure, as shown in FIG. 11, the display panel further includes a third scan control circuit 710 and a fourth scan control circuit 720 in the non-display area. The third scan control circuit 710 is electrically connected to the second scan signal lines GAS_N in the first area aa1, so that the third scan control circuit 710 is electrically connected to the sub-pixels in the first area aa1. Furthermore, the fourth scan control circuit 720 is electrically connected to the second scan signal lines GAS_N in the second area aa2, so that the fourth scan control circuit 720 is electrically connected to the sub-pixels in second area aa2.

In some implementations of the present disclosure, the driving circuit is further configured to control the third scan control circuit 710 to output a corresponding second scan signal to each sub-pixel in the first area aa1, and to control the fourth scan control circuit 720 to output a corresponding second scan signal to each sub-pixel in the second area aa2.

In some implementations of the present disclosure, the display panel further includes a plurality of data lines in the display area, and the data signal terminals of the pixel circuits in a column of sub-pixels may be electrically connected to one of the data lines. Alternatively, the data signal terminals of the pixel circuit in two columns of sub-pixels may be electrically connected to one of the data lines, which is not limited herein.

For example, during each preset display frame, the driving circuit may drive the corresponding transistors in the sub-pixels in the first area aa1 in the display panel based on the first reset signal re_n, the second reset signal re_p, the first scan signal ga_p, the second scan signal ga_n, and the light emission control signal em1 shown in FIG. 5. The driving circuit further controls the data lines connected to the sub-pixels in the photosensitive area to be input with a data voltage corresponding to a zero grayscale, and control the remaining data lines not to be input with a data voltage. For example, the driving circuit may control the first reset control circuit 410 to output the first reset signal re_n shown in FIG. 5 to the sub-pixels in the first area aa1, control the third reset control circuit 510 to output the second reset signal re_p shown in FIG. 5 to the sub-pixels in the first area aa1, control the first scan control circuit 610 to output the first scan signal ga_p shown in FIG. 5 to the sub-pixels in the first area aa1, control the third scan control circuit 710 to output the second scan signal ga_n shown in FIG. 5 to the sub-pixels in the first area aa1, and control the first light emission control circuit 310 to output the light emission control signal em1 shown in FIG. 5 to the sub-pixels in the first area aa1.

For example, during each preset display frame, the driving circuit may control the second reset control circuit 420 to stop outputting the first reset signal, control the fourth reset control circuit 520 to stop outputting the second reset signal, control the second scan control circuit 620 to stop outputting the first scan signal, control the fourth scan control circuit 720 to stop outputting the second scan signal, and control the second light emission control circuit 320 to stop outputting the light emission control signal. The driving circuit may control not to input the data voltage to all the data lines. In this way, the sub-pixels in the second area aa2 may hold the original data voltage during each preset display frame, thereby maintaining the original display image and further reducing the power consumption of the display panel.

For example, during each preset display frame, the driving circuit may drive the corresponding transistors in the sub-pixels in the second area aa2 in the display panel based on the first reset signal re_n, the second reset signal re_p, the first scan signal ga_p, the second scan signal ga_n, and the light emission control signal em shown in FIG. 4. In addition, the driving circuit may control not to input a data voltage to each data line, so that the sub-pixels in the second area aa2 hold the original data voltage during each preset display frame, thereby maintaining displaying the original image, or may control to input the data voltages of corresponding grayscales to all the data lines, thereby displaying a new image. For example, the driving circuit may control the second reset control circuit 420 to output the first reset signal re_n as shown in FIG. 4 to the sub-pixels in the second area aa2, control the fourth reset control circuit 520 to output the second reset signal re_p as shown in FIG. 4 to the sub-pixels in the second area aa2, control the second scan control circuit 620 to output the first scan signal ga_p as shown in FIG. 4 to the sub-pixels in the second area aa2, control the fourth scan control circuit 720 to output the second reset signal re_n as shown in FIG. 4 to the sub-pixels in the second area aa2, and control the second light emission control circuit 320 to output the light emission control signal em as shown in FIG. 4 to the sub-pixels in the second area aa2.

For example, during each remaining display frame other than the preset display frame, the driving circuit may drive the transistors in the sub-pixels in the first and second areas aa1 and aa2 in the display panel based on the first reset signal re_n, the second reset signal re_p, the first scan signal ga_p, the second scan signal ga_n, and the light emission control signal em shown in FIG. 4. In addition, the driving circuit controls the data voltages corresponding to corresponding grayscales to be input to all the data lines so as to display an image. For example, the driving circuit may control the first reset control circuit 410 to output the first reset signal re_n as shown in FIG. 4 to the sub-pixels in the first area aa1, control the third reset control circuit 510 to output the second reset signal re_p as shown in FIG. 4 to the sub-pixels in the first area aa1, control the first scan control circuit 610 to output the first scan signal ga_p as shown in FIG. 4 to the sub-pixels in the first area aa1, control the third scan control circuit 710 to output the second scan signal ga_n as shown in FIG. 4 to the sub-pixels in the first area aa1, and control the first light emission control circuit 310 to output the light emission control signal em as shown in FIG. 4 to the sub-pixels in the first area aa1. Furthermore, the driving circuit may control the second reset control circuit 420 to output the first reset signal re_n as shown in FIG. 4 to the sub-pixels in the second area aa2, control the fourth reset control circuit 520 to output the second reset signal re_p as shown in FIG. 4 to the sub-pixels in the second area aa2, control the second scan control circuit 620 to output the first scan signal ga_p as shown in FIG. 4 to the sub-pixels in the second area aa2, control the fourth scan control circuit 720 to output the second scan signal ga_n as shown in FIG. 4 to the sub-pixels in the second area aa2, and control the second light emission control circuit 320 to output the light emission control signal em as shown in FIG. 4 to the sub-pixels in the second area aa2.

Alternatively, all the first reset signal lines may be electrically connected to one reset control circuit, all the second reset signal lines may be electrically connected to another reset control circuit, all the first scan signal lines may be electrically connected to one scan control circuit, and all the second scan signal lines may be electrically connected to another scan control circuit, which is not limited herein.

Figure 12:
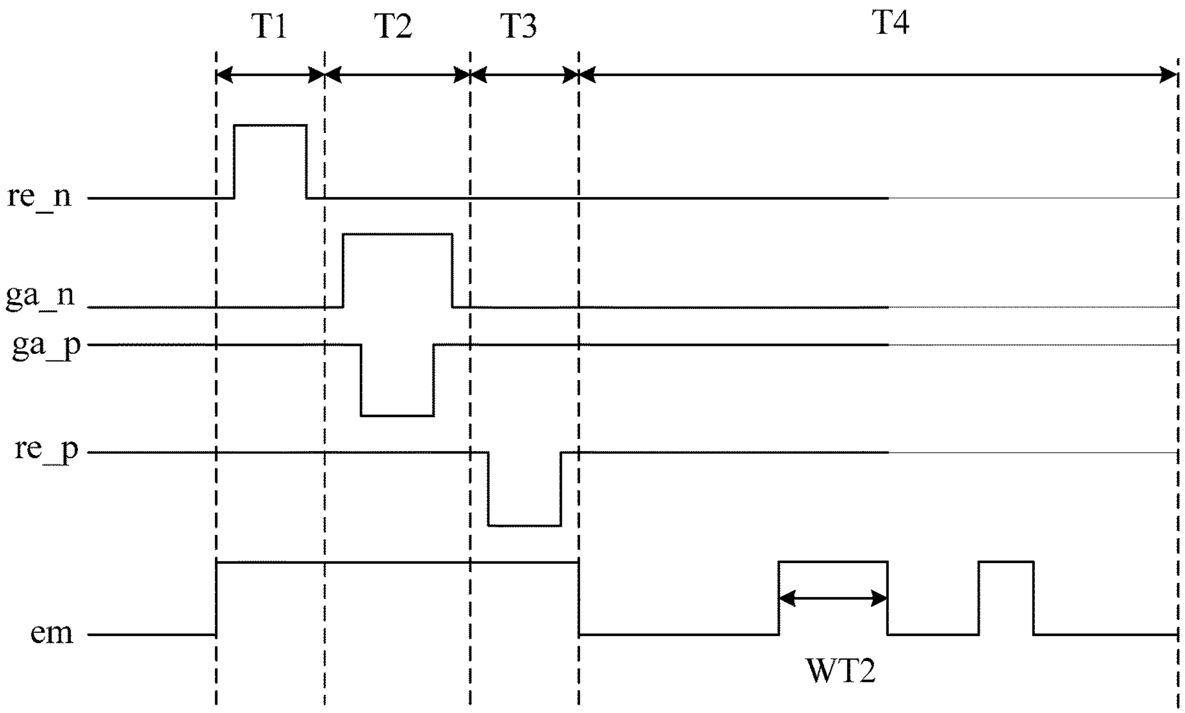
FIG. 12 shows a timing diagram of some signals according to an embodiment of the present disclosure.
Figure 13:
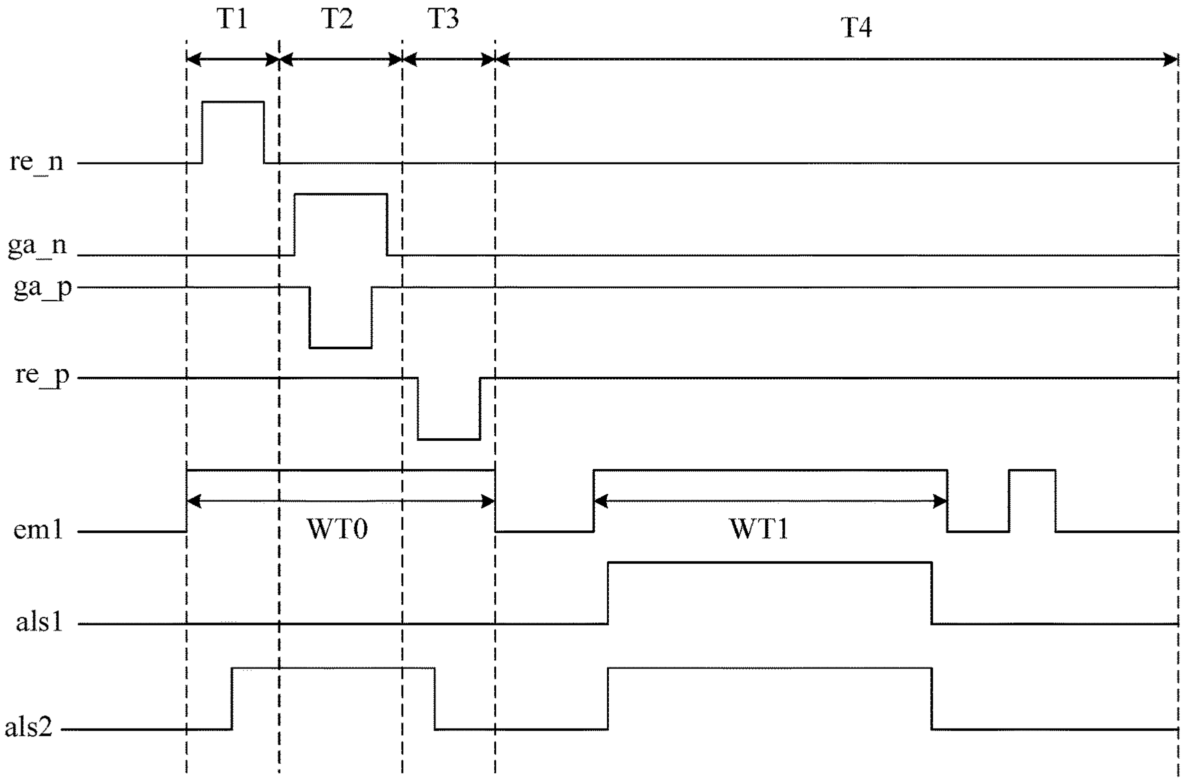
FIG. 13 shows a timing diagram of some signals according to an embodiment of the present disclosure.

The embodiment of the present disclosure provides still other timing diagrams of signals, as shown in FIG. 12 and FIG. 13, which are modified for the above embodiment. Only the differences between the present embodiment and the above embodiment will be described below, and the same parts between the present embodiment and the above embodiment will not be described herein again.

In the embodiment of the present disclosure, the light emission control signal has a plurality of inactive pulses in the light-emitting period. For example, as shown in FIGS. 12 and 13, the light emission control signal has two inactive pulses in the light-emitting period. Alternatively, the light emission control signal may have three, four or more inactive pulses in the light-emitting period, which is not limited herein. Thus, the light emission control signal may be a pulse width modulation (PWM) signal, so as to control the brightness of the light-emitting diode L through the PWM signal, thereby improving the display effect of the display panel. That is, in a case where the light emission control signal is the PWM signal, the inactive pulse of the light emission control signal in the light-emitting period may be multiplexed and extended to control each photosensitive element to collect the light intensity signal during the multiplexed and extended inactive pulse.

In the embodiment of the present disclosure, one of the plurality of inactive pulses that the light emission control signal has in the light-emitting period is an inactive pulse having a first duration. Furthermore, the inactive pulse with the longest duration of the plurality of inactive pulses is the inactive pulse with the first duration. For example, as shown in FIG. 13, the light emission control signal em1 has two inactive pulses in the light-emitting period T4, and the inactive pulse having the longest duration of the two inactive pulses is the inactive pulse with the first duration WT1.

In some implementations of the present disclosure, the driving circuit is further configured to control each of the sub-pixels in the display panel to be input with a data voltage corresponding to a corresponding grayscale during each remaining display frame other than the preset display frame. In some implementations, for the remaining display frames, such as the display frame FA1, the display frame FA3, the display frame FA5, the display frame FA7, the display frame FA9 and the display frame FA 11, of the plurality of display frames other than the preset display frames, the driving circuit may drive each sub-pixel in the display panel to perform the operation process of each display frame based on a first reset signal re_n, a second reset signal re_p, a first scan signal ga_p, a second scan signal ga_n and a light emission control signal em in the timing diagram of signals shown in FIG. 12 to display an image. That is, the driving circuit is further configured to control the light emission control signals corresponding to the sub-pixels in the first and second areas aa1 and aa2 to be the same in the remaining display frames other than the preset display frame.

In some implementations of the present disclosure, the driving circuit is further configured to control, during each of the remaining display frames, each sub-pixel of the display panel to be input with a data voltage corresponding to a corresponding grayscale to display an image. That is, in each of the remaining display frames, each sub-pixel of the display panel is controlled to be input with the data voltage corresponding to the corresponding grayscale. For example, during each preset display frame, the driving circuit may drive each sub-pixel in the first area aa1 of the display panel to perform the operation process of each display frame based on the first reset signal re_n, the second reset signal re_p, the first scan signal ga_p, the second scan signal ga_n and the light emission control signal em1 in the timing diagram of signals shown in FIG. 13. Furthermore, the driving circuit may drive each sub-pixel in the second area aa2 of the display panel to perform the operation process of each display frame based on the first reset signal re_n, the second reset signal re_p, the first scan signal ga_p, the second scan signal ga_n and the light emission control signal em in the timing diagram of signals shown in FIG. 12. During each remaining the display frame, the driving circuit may drive each sub-pixel in the first area aa1 of the display panel to perform the operation process of each display frame based on the first reset signal re_n, the second reset signal re_p, the first scan signal ga_p, the second scan signal ga_n and the light emission control signal em1 in the timing diagram of signals shown in FIG. 13. Furthermore, the driving circuit may drive each sub-pixel in the second area aa2 of the display panel to perform the operation process of each display frame based on the first reset signal re_n, the second reset signal re_p, the first scan signal ga_p, the second scan signal ga_n and the light emission control signal em in the timing diagram of signals shown in FIG. 12.

In some implementations, as shown in FIG. 12 and FIG. 13, the driving circuit is further configured to control, during each preset display frame, the light emission control signal em corresponding to each sub-pixel in the second area aa2 to include an inactive pulse with a second duration WT2 in the light-emitting period, so that each sub-pixel in the second area aa2 is in the non-light-emitting state in the light-emitting period. The inactive pulse with the first duration WT1 and the inactive pulse with the second duration WT2 are inactive pulses with the same order of occurrence in the light-emission control signal (e.g., the inactive pulse with the first duration WT1 and the inactive pulse with the second duration WT2 each occur for the first time in the light-emitting period), and the first duration WT1 is longer than the second duration WT2.

In some implementations of the present disclosure, in a case where there are at least two preset display frames in adjacent display frames, the driving circuit is further configured to control, during each preset display frame, each sub-pixel in the photosensitive area to be input with a data voltage corresponding to a zero grayscale. Since Vda of the gate voltage Vda+Vth of the driving transistor M0 is the data voltage corresponding to a zero grayscale, the current IL generated by the driving transistor M0 is minimized and is not enough to drive the light-emitting diode L to emit light, so that each sub-pixel in the photosensitive area may be directly in the non-light-emitting state during the light-emitting period. Furthermore, in a case where there are at least two preset display frames in the adjacent display frames, the driving circuit is further configured to control, during each preset display frame, each sub-pixel in the remaining area of the display panel to be in a state of holding the data voltage. For example, each sub-pixel in the remaining area may not be input with the corresponding data voltage, so that each sub-pixel in the remaining area is in the state of holding the data voltage, thus the power consumption is reduced. For example, during each preset display frame, the driving circuit may drive each sub-pixel in the first area aa1 of the display panel to perform the operation process of each display frame based on the timing diagram of signals shown in FIG. 13. Furthermore, the driving circuit stops outputting the light emission control signal to each sub-pixel in the second area aa2. In this way, the power consumption can be reduced. Furthermore, the driving circuit further stops outputting the first reset signal re_n, the second reset signal re_p, the first scan signal ga_p, and the second scan signal ga_n to each sub-pixel in the second area aa2. Thus, each sub-pixel in the remaining area of the display panel is controlled to be in the state of holding the data voltage, so that the power consumption can be further reduced.

For example, during each preset display frame, the driving circuit may drive the transistors in the sub-pixels in the first area aa1 of the display panel based on the first reset signal re_n, the second reset signal re_p, the first scan signal ga_p, the second scan signal ga_n, and the light emission control signal em1 shown in FIG. 13. Furthermore, the driving circuit controls to input a data voltage corresponding to a zero grayscale to the data line connected to each sub-pixel in the photosensitive area, and control not to input a data voltage to each of the remaining data lines. For example, the driving circuit may control the first reset control circuit 410 to output the first reset signal re_n shown in FIG. 13 to the sub-pixels in the first area aa1, control the third reset control circuit 510 to output the second reset signal re_p shown in FIG. 13 to the sub-pixels in the first area aa1, control the first scan control circuit 610 to output the first scan signal ga_p shown in FIG. 13 to the sub-pixels in the first area aa1, control the third scan control circuit 710 to output the second scan signal ga_n shown in FIG. 13 to the sub-pixels in the first area aa1, and control the first light emission control circuit 310 to output the light emission control signal em1 shown in FIG. 13 to the sub-pixels in the first area aa1.

For example, during each preset display frame, the driving circuit may control the second reset control circuit 420 to stop outputting the first reset signal, control the fourth reset control circuit 520 to stop outputting the second reset signal, control the second scan control circuit 620 to stop outputting the first scan signal, control the fourth scan control circuit 720 to stop outputting the second scan signal, and control the second light emission control circuit 320 to stop outputting the light emission control signal. The driving circuit controls not to input the data voltage to all the data lines. In this way, the power consumption of the display panel can be reduced.

In some implementations, during each preset display frame, the driving circuit may drive the transistors in the sub-pixels in the second area aa2 of the display panel based on the first reset signal re_n, the second reset signal re_p, the first scan signal ga_p, the second scan signal ga_n, and the light emission control signal em shown in FIG. 12. Furthermore, the driving circuit controls not to input data voltages to all the data lines or controls to input data voltages corresponding to corresponding grayscales to all data lines. For example, the driving circuit may control the second reset control circuit 420 to output the first reset signal re_n shown in FIG. 12 to the sub-pixels in the second area aa2, control the fourth reset control circuit 520 to output the second reset signal re_p shown in FIG. 12 to the sub-pixels in the second area aa2, control the second scan control circuit 620 to output the first scan signal ga_p shown in FIG. 12 to the sub-pixels in the second area aa2, control the fourth scan control circuit 720 to output the second scan signal ga_n shown in FIG. 12 to the sub-pixels in the second area aa2, and control the second light emission control circuit 320 to output the light emission control signal em shown in FIG. 12 to the sub-pixels in the second area aa2.

In some implementations, during each of the remaining display frames other than each preset display frame, the driving circuit may drive the transistors in the sub-pixels in the first area aa1 and the second area aa2 of the display panel based on the first reset signals re_n, the second reset signal re_p, the first scan signal ga_p, the second scan signal ga_n and the light emission control signal em shown in FIG. 12. Furthermore, the driving circuit controls to input a data voltage corresponding to a corresponding grayscale to each data line. For example, the driving circuit may control the first reset control circuit 410 to output the first reset signal re_n shown in FIG. 12 to the sub-pixels in the first area aa1, control the third reset control circuit 510 to output the second reset signal re_p shown in FIG. 12 to the sub-pixels in the first area aa1, control the first scan control circuit 610 to output the first scan signal ga_p shown in FIG. 12 to the sub-pixels in the first area aa1, control the third scan control circuit 710 to output the second scan signal ga_n shown in FIG. 12 to the sub-pixels in the first area aa1, and control the first light emission control circuit 310 to output the light emission control signal em shown in FIG. 12 to the sub-pixels in the first area aa1. Furthermore, the driving circuit may control the second reset control circuit 420 to output the first reset signal re_n as shown in FIG. 12 to the sub-pixels in the second area aa2, control the fourth reset control circuit 520 to output the second reset signal re_p as shown in FIG. 12 to the sub-pixels in the second area aa2, control the second scan control circuit 620 to output the first scan signal ga_p as shown in FIG. 12 to the sub-pixels in the second area aa2, control the fourth scan control circuit 720 to output the second scan signal ga_n as shown in FIG. 12 to the sub-pixels in the second area aa2, and control the second light emission control circuit 320 to output the light emission control signal em as shown in FIG. 12 to the sub-pixels in the second area aa2.

In some implementations of the present disclosure, the driving circuit may control an inactive pulse with a first duration WT1 to occur, in the light-emitting period, in the light emission control signal corresponding to each sub-pixel in the first area aa1, so that each sub-pixel in the first area aa1 is in the non-light-emitting state in the light-emitting period, and control each photosensitive element in the photosensitive area to collect the light intensity signal of incident light. Taking a case where the photosensitive element array is an array of ambient light sensor (ALS) as an example, brightness of the ambient light can be determined according to the light intensity signal collected by each photosensitive element, so that the display brightness of the display panel can be adjusted according to the determined brightness of the ambient light.

In some implementations, as shown in FIG. 13, als1 represents a collection control signal for controlling the photosensitive element, and in a case where each sub-pixel in the photosensitive area is controlled to be in a non-light-emitting state in the light-emitting period T4 during each preset display frame, the collection control signal als1 is at a high level, and each photosensitive element is controlled to collect the light intensity signal.

In some implementations of the present disclosure, the driving circuit may further control, in response to the fact that each sub-pixel in the photosensitive area is in the light-emitting period during each preset display frame, each of the photosensitive elements to collect the light intensity signal of the incident light for the first time. The driving circuit may control an inactive pulse with a first duration WT1 to occur, in the light-emitting period, in the light emission control signal corresponding to each sub-pixel in the first area aa1, so that each sub-pixel in the first area aa1 is in a non-light-emitting state in the light-emitting period, and control each photosensitive element in the photosensitive area to collect the light intensity signal of the incident light for the second time. Taking a case where the photosensitive element array is an array of ambient light sensors (ALS) as an example, the light intensity signal collected for the first time can be corrected according to the light intensity signal collected by each photosensitive element for the second time, and therefore, the brightness of the ambient light can be determined. That is, the brightness of the ambient light can be determined according to the light intensity signals collected by each photosensitive element for the first time and for the second time, so that the display brightness of the display panel can be adjusted based on the determined brightness of the ambient light.

In some implementations, as shown in FIG. 13, als2 represents a collection control signal for controlling the photosensitive element, which is configured to control, in response to the fact that each sub-pixel in the photosensitive area is in a non-light-emitting state in the non-light-emitting period (i.e., from T1 to T3) and the light-emitting period T4 during each preset display frame, the collection control signal als2 to be at a high level, so as to control each photosensitive element to collect the light intensity signal.

Figure 14:
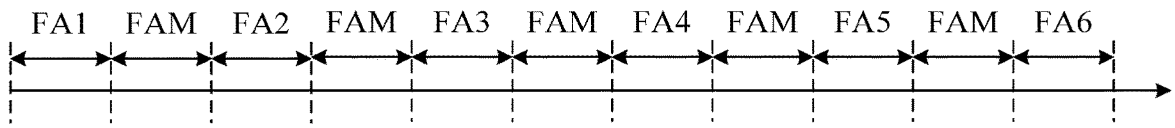
FIG. 14 is a schematic diagram of some display frames according to an embodiment of the disclosure.

An embodiment of the present disclosure further provides a timing diagram of signals as shown in FIG. 14, which are obtained by modifying the implementations of the above-described embodiments. Only the differences between the present embodiment and the above-described embodiments will be described below, and the same parts between the present embodiment and the above-described embodiments will not be described herein again.

In some implementations of the present disclosure, the driving circuit may further insert an intermediate display frame for displaying a black picture between every two adjacent display frames to control each photosensitive element in the photosensitive area to collect the light intensity signal of the incident light during the intermediate display frame. Therefore, each photosensitive element can collect the light intensity signal in a duration of one display frame, therefore, the accuracy of the collected light intensity signal can be improved.

In some implementations, the intermediate display frame is inserted between every two adjacent display frames. For example, taking the display frames FA1 to FA6 as an example, an intermediate display frame FAM may be inserted between the display frame FA1 and the display frame FA2, and an intermediate display frame FAM may be inserted between the display frame FA2 and the display frame FA3, and so on, which is not repeated herein.

Alternatively, an intermediate display frame may be inserted between every three adjacent display frames of the adjacent display frames. Alternatively, an intermediate display frame may be inserted between every four, five or more adjacent display frames of the adjacent display frames, which is not limited herein.

For example, during the intermediate display frame, the driving circuit may control each sub-pixel in the photosensitive area to display a black picture. Alternatively, during the intermediate display frame, the driving circuit may control to input a data voltage corresponding to a zero grayscale to each sub-pixel in the photosensitive area, so that the sub-pixels in the photosensitive area display a black picture.

For example, during the intermediate display frame, the driving circuit may drive the corresponding transistors in the sub-pixels in the first area aa1 of the display panel based on the first reset signal re_n, the second reset signal re_p, the first scan signal ga_p, the second scan signal ga_n, and the light emission control signal em1 shown in FIG. 5 or FIG. 13. Furthermore, the driving circuit controls to input a data voltage corresponding to a zero grayscale to the data lines connected to the sub-pixels in the photosensitive area, and not to input a data voltage to the remaining data lines. For example, the driving circuit may control the first reset control circuit 410 to output the first reset signal re_n shown in FIG. 5 or 13 to the sub-pixels in the first area aa1, control the third reset control circuit 510 to output the second reset signal re_p shown in FIG. 5 or 13 to the sub-pixels in the first area aa1, control the first scan control circuit 610 to output the first scan signal ga_p shown in FIG. 5 or 13 to the sub-pixels in the first area aa1, control the third scan control circuit 710 to output the second scan signal ga_n shown in FIG. 5 or 13 to the sub-pixels in the first area aa1, and control the first light emission control circuit 310 to output the light emission control signal em1 shown in FIG. 5 or 13 to the sub-pixels in the first area aa1.

For example, during the intermediate display frame, the driving circuit may control the sub-pixels in the remaining area other than the photosensitive area to keep displaying the display picture of the previous display frame. Alternatively, during the intermediate display frame, the driving circuit may control each sub-pixel in the remaining area other than the photosensitive area to hold the data voltage of the previous display frame, so that the sub-pixels in the remaining area keep displaying the display picture of the previous display frame. Therefore, the power consumption of the display panel can be reduced.

For example, during the intermediate display frame, the driving circuit may control the second reset control circuit 420 to stop outputting the first reset signal, control the fourth reset control circuit 520 to stop outputting the second reset signal, control the second scan control circuit 620 to stop outputting the first scan signal, control the fourth scan control circuit 720 to stop outputting the second scan signal, and control the second light emission control circuit 320 to stop outputting the light emission control signal. Furthermore, the driving circuit controls not to input the data voltage to all the data lines. In this way, the sub-pixels in the second area aa2 can maintain the previous data voltage during each preset display frame, and thus maintain the previous display picture, so that the power consumption of the display panel can be further reduced.

In some implementations, the driving circuit may control the display panel to display a normal picture during each display frame. For example, the driving circuit may drive the transistors in the sub-pixels in the first area aa1 and the second area aa2 of the display panel based on the first reset signal re_n, the second reset signal re_p, the first scan signal ga_p, the second scan signal ga_n, and the light emission control signal em shown in FIG. 4 or 12. In addition, the driving circuit controls to input data voltages corresponding to corresponding grayscales to all the data lines so as to display the picture. For example, the driving circuit may control the first reset control circuit 410 to output the first reset signal re_n shown in FIG. 4 or 12 to the sub-pixels in the first area aa1, control the third reset control circuit 510 to output the second reset signal re_p shown in FIG. 4 or 12 to the sub-pixels in the first area aa1, control the first scan control circuit 610 to output the first scan signal ga_p shown in FIG. 4 or 12 to the sub-pixels in the first area aa1, control the third scan control circuit 710 to output the second scan signal ga_n shown in FIG. 4 or 12 to the sub-pixels in the first area aa1, and control the first light emission control circuit 310 to output the light emission control signal em shown in FIG. 4 or 12 to the sub-pixels in the first area aa1. Furthermore, the driving circuit may control the second reset control circuit 420 to output the first reset signal re_n as shown in FIG. 4 or 12 to the sub-pixels in the second area aa2, control the fourth reset control circuit 520 to output the second reset signal re_p as shown in FIG. 4 or 12 to the sub-pixels in the second area aa2, control the second scan control circuit 620 to output the first scan signal ga_p as shown in FIG. 4 or 12 to the sub-pixels in the second area aa2, control the fourth scan control circuit 720 to output the second scan signal ga_n as shown in FIG. 4 or 12 to the sub-pixels in the second area aa2, and control the second light emission control circuit 320 to output the light emission control signal em as shown in FIG. 4 or 12 to the sub-pixels in the second area aa2.

An embodiment of the present disclosure further provides a driving method, including: controlling, in response to the fact that each sub-pixel in the photosensitive area of the display panel is controlled to be in a non-light-emitting state in a light-emitting period during a preset display frame, each photosensitive element in a photosensitive area to collect a light intensity signal of incident light. The operation principle and the specific implementations of the driving method are the same as those of the driving circuit in the above-described embodiments, and therefore, the driving method may be implemented by referring to the specific implementations of the driving circuit in the above-described embodiments, and is not described again here.

As will be appreciated by a person skilled in the art, the embodiments of the present disclosure may be provided as a method, a system, or a computer program product. Accordingly, the present disclosure may take the form of an embodiment of a complete hardware, an embodiment of a complete software or an embodiment combining software and hardware aspects. Furthermore, the present disclosure may take the form of a computer program product embodied on one or more computer-readable storage medium (including, but not limited to, disk storage, CD-ROM, optical storage, and the like) having computer-readable program code embodied therein.

The present disclosure is described with reference to flowcharts and/or block diagrams of the methods, the apparatus (systems), and the computer program product according to the present disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing apparatus to produce a machine, such that the instructions, which are executed by the processor of the computer or other programmable data processing apparatus, create means for implementing the functions specified in one or more flows in the flowchart and/or one or more blocks in the block diagram.

These computer program instructions may alternatively be stored in a computer-readable memory that can direct a computer or other programmable data processing apparatus to operate in a specific manner, such that the instructions stored in the computer-readable memory produce a product including an instruction mean which implements the function specified in one or more flows in the flowchart and/or one or more blocks in the block diagram.

These computer program instructions may alternatively be loaded onto a computer or other programmable data processing apparatus to cause a series of operation steps to be performed on the computer or other programmable apparatus to produce a computer implemented process such that the instructions which are executed on the computer or other programmable apparatus provide steps for implementing the functions specified in one or more flows in the flowchart and/or one or more blocks in the block diagram.

Although preferred embodiments of the present disclosure have been described, a person skilled in the art may make additional changes and modifications to these embodiments once they have knowledge of the basic creative concepts. Therefore, the attached claims are intended to be interpreted as including the preferred embodiments and all changes and modifications falling within the scope of the present disclosure.

It will be apparent to a person skilled in the art that various changes and modifications may be made in the present disclosure without departing from the spirit and scope of the present disclosure. Thus, if such changes and modifications of the present disclosure fall within the scope of the claims of the present disclosure and their equivalents, the present disclosure is intended to include such modifications and changes as well.

What is claimed is:

1. A display apparatus, comprising:

a display panel; and a driving circuit electrically connected to the display panel, wherein the driving circuit is configured to control, in response to the fact that each of sub-pixels in a photosensitive area of the display panel is controlled to be in a non-light-emitting state in a light-emitting period during a preset display frame, each of photosensitive elements in the photosensitive area to collect a light intensity signal of incident light, wherein the display panel comprises a first area and a second area sequentially arranged in a column direction of the sub-pixels, the first area comprising the photosensitive area; and the driving circuit is further configured to control, in response to the fact that each of the sub-pixels in the first area is controlled to be in the non-light-emitting state in the light-emitting period during the preset display frame, each of the photosensitive elements in the photosensitive area to collect the light intensity signal of incident light, and wherein the driving circuit is further configured to control an inactive pulse with a first duration to occur, in the light-emitting period, in a light emission control signal corresponding to each sub-pixel in the first area, to make each sub-pixel in the first area be in the non-light-emitting state in the light-emitting period, and a level of the inactive pulse of the light emission control signal is configured to control a light emission control transistor in the display panel to be turned off, and the first duration is longer than a duration of the non-light-emitting period of the sub-pixel, the non-light-emitting period occurring before the light-emitting period.

2. The display apparatus of claim 1, wherein the light emission control signal has at least one inactive pulse in the light-emitting period; and one of the at least one inactive pulse is the inactive pulse with the first duration.

3. The display apparatus of claim 2, wherein the light emission control signal has a plurality of inactive pulses in the light-emitting period, and one of the inactive pulses having a longest duration is the inactive pulse with the first duration.

4. The display apparatus of claim 1, wherein the driving circuit is further configured to stop outputting the light emission control signal to each of sub-pixels in the second area during the preset display frame, or the driving circuit is further configured to control an inactive pulse with a second duration to occur, during the preset display frame, in the light emission control signal corresponding to each sub-pixel in the second area in the light-emitting period, to make each sub-pixel in the second area be in the non-light-emitting state in the light-emitting period; and the inactive pulse with the first duration occurs in the light emission control signal corresponding to each sub-pixel in the first area in a same occurrence order as the inactive pulse with the second duration occurs in the light emission control signal corresponding to each sub-pixel in the second area, and the first duration is longer than the second duration.

5. The display apparatus of claim 4, wherein the driving circuit is further configured to control, during each of remaining display frames other than the preset display frame, light emission control signals corresponding to the sub-pixels in the first area and the second area to be the same in the remaining display frames other than the preset display frame.

6. The display apparatus of claim 4, wherein the display panel further comprises: a first light emission control circuit and a second light emission control circuit, the first light emission control circuit being electrically connected to the sub-pixels in the first area, and the second light emission control circuit being electrically connected to the sub-pixels in the second area; and the driving circuit is further configured to control the first light emission control circuit to output a corresponding light emission control signal to each sub-pixel in the first area, and control the second light emission control circuit to output a corresponding light emission control signal to each sub-pixel in the second area.

7. The display apparatus of claim 1, wherein each of a plurality of adjacent display frames is the preset display frame; and/or at least two display frames of a plurality of adjacent display frames each are the preset display frame, and at least one of remaining display frames other than the preset display frame is arranged between two adjacent preset display frames.

8. The display apparatus of claim 7, wherein at least two display frames of a plurality of adjacent display frames each are the preset display frame; and the driving circuit is further configured to control each sub-pixel in the photosensitive area to be input with a data voltage corresponding to a zero grayscale during the preset display frame, and control each sub-pixel in a rest area of the display panel other than the photosensitive area to be in a state of holding a data voltage during each preset display frame, and wherein the driving circuit is further configured to control each of the sub-pixels in the display panel to be input with a data voltage corresponding to a corresponding grayscale during each of the remaining display frames other than each preset display frame.

9. The display apparatus of claim 7, wherein the driving circuit is further configured to control, during each of the plurality of display frames, each sub-pixel in the display panel to be input with a data voltage corresponding to a corresponding grayscale.

10. A driving method, comprising:

controlling, in response to the fact that each of sub-pixels in a photosensitive area of a display panel is controlled to be in a non-light-emitting state in a light-emitting period during a preset display frame, each photosensitive element in the photosensitive area to collect a light intensity signal of incident light, wherein the display panel comprises a first area and a second area sequentially disposed in a column direction of the sub-pixels, the first area comprising the photosensitive area;

the controlling each of sub-pixels in the photosensitive area of the display panel to be in the non-light-emitting state in the light-emitting period during the preset display frame comprises:

controlling an inactive pulse with a first duration to occur, in the light-emitting period, in a light emission control signal corresponding to each sub-pixel in the first area, to make each sub-pixel in the first area be in the non-light-emitting state in the light-emitting period, and a level of the inactive pulse of the light emission control signal is configured to control a light emission control transistor in the display panel to be turned off, and the first duration is longer than a duration of the non-light-emitting period of each sub-pixel, the non-light-emitting period occurring before the light-emitting period.

11. The driving method of claim 10, wherein the light emission control signal has at least one inactive pulse in the light-emitting period; and one of the at least one inactive pulse is the inactive pulse with the first duration.

12. The driving method of claim 11, wherein the light emission control signal has a plurality of inactive pulses in the light-emitting period, and one of the inactive pulses having a longest duration is the inactive pulse with the first duration.

13. The driving method of claim 10, further comprising: controlling an inactive pulse with a second duration to occur, during the preset display frame, in the light emission control signal corresponding to each sub-pixel in the second area in the light-emitting period, to make each sub-pixel in the second area be in the non-light-emitting state in the light-emitting period; and the inactive pulse with the first duration occurs in the light emission control signal corresponding to each sub-pixel in the first area in a same occurrence order as the inactive pulse with the second duration occurs in the light emission control signal corresponding to each sub-pixel in the second area, and the first duration is longer than the second duration.

14. The driving method of claim 10, further comprising: controlling, during each of remaining display frames other than the preset display frame, light emission control signals corresponding to the sub-pixels in the first area and the second area to be the same.

15. The driving method of claim 10, wherein each of a plurality of adjacent display frames is the preset display frame; and/or at least two display frames of a plurality of adjacent display frames each are the preset display frame, and at least one of remaining display frames other than the preset display frame is arranged between every two adjacent preset display frames.

16. The driving method of claim 15, wherein at least two display frames of a plurality of adjacent display frames each is the preset display frame; and the driving method further comprises: controlling each sub-pixel in the photosensitive area to be input with a data voltage corresponding to a zero grayscale during each preset display frame; and controlling each sub-pixel in a rest area of the display panel other than the photosensitive area to be in a state of holding a data voltage during each preset display frame; and the driving method further comprises: controlling each of the sub-pixels in the display panel to be input with a data voltage corresponding to a corresponding grayscale during each of the remaining display frames other than each preset display frame.

17. The driving method of claim 15, further comprising: controlling, during each of the plurality of display frames, each sub-pixel in the display panel to be input with a data voltage corresponding to a corresponding grayscale.

* * * * *